(12) United States Patent
Suzuki et al.

(10) Patent No.: US 7,761,651 B2
(45) Date of Patent: Jul. 20, 2010

(54) INFORMATION PROCESSING APPARATUS

(75) Inventors: Tatsuo Suzuki, Uji (JP); Naoko Suzuki, Obu (JP)

(73) Assignee: Panasonic Corporation, Osaka (JP)

( * ) Notice: Subject to any disclaimer, the term of this patent is extended or adjusted under 35 U.S.C. 154(b) by 429 days.

(21) Appl. No.: 11/406,358

(22) Filed: Apr. 19, 2006

(65) Prior Publication Data

US 2007/0050533 A1   Mar. 1, 2007

(30) Foreign Application Priority Data

Aug. 24, 2005   (JP) .............................. 2005-242329

(51) Int. Cl.
*G06F 12/00* (2006.01)
*G06F 9/00* (2006.01)

(52) U.S. Cl. .......................... 711/103; 711/170; 713/1; 713/2; 713/100

(58) Field of Classification Search ................. 711/103, 711/107; 713/1, 2, 100
See application file for complete search history.

(56) References Cited

U.S. PATENT DOCUMENTS

| 2004/0249494 | A1* | 12/2004 | Kobayashi et al. .......... 700/112 |
| 2005/0015275 | A1* | 1/2005 | Takekawa et al. ............... 705/1 |
| 2005/0030112 | A1* | 2/2005 | Kosuda et al. ................. 331/46 |
| 2005/0032549 | A1* | 2/2005 | Kawaguchi ............... 455/556.1 |

FOREIGN PATENT DOCUMENTS

| JP | 2000-10666 A | 1/2000 |
| JP | 2000-105694 A | 4/2000 |
| JP | 2001-75796 A | 3/2001 |
| JP | 2001-243122 A | 9/2001 |
| JP | 2002-157137 A | 5/2002 |

* cited by examiner

*Primary Examiner*—Christian P Chace
*Assistant Examiner*—Mehdi Namazi
(74) *Attorney, Agent, or Firm*—McDermott Will & Emery LLP

(57) ABSTRACT

An information processing apparatus according to the present invention comprises a communication device, a volatile memory for storing a communication data therein, a first CPU for controlling communication processings of the communication device and the communication data stored in the volatile memory, a ROM memory in which a program of the first CPU is previously stored, a second CPU for controlling the whole apparatus, a non-volatile memory for storing a whole program of the second CPU therein, a ROM memory in which another program executable by the second CPU is previously stored; and an external input terminal adapted in such a manner that if program execution by the second CPU starts in the non-volatile memory or in the ROM memory is selectively set, wherein where the program execution starts is selected in accordance with the setting of the external input terminal when activated, and a rewriting program for the whole program of the non-volatile memory is stored in the ROM memory.

59 Claims, 12 Drawing Sheets

INFORMATION PROCESSING APPARATUS

FIELD OF THE INVENTION

The present invention relates to an information processing apparatus such as an optical disk apparatus and a method for writing data in a non-volatile memory provided in the information processing apparatus.

BACKGROUND OF THE INVENTION

In an information processing apparatus such as an optical disk apparatus, data is generated through parallel data communication executed between the information processing apparatus and a host computer, and various types of information processings (for example, writing and reading processings with respect to the optical disk) are executed to the obtained data.

In the information processing apparatus, a program for executing the parallel data communication between the information processing apparatus and the host computer (hereinafter, referred to as communication program), and the like, are stored in a ROM memory. A program in charge of the whole apparatus which executes a control operation and the like to the communication program stored in the ROM memory, and the like, (hereinafter, referred to as whole program, and generally called firmware (hereinafter F/W)) are stored in a non-volatile memory (Flash ROM or the like). In normal operations, the whole program written in the non-volatile memory is executed on the non-volatile memory so that the various types of processings are executed. At the time, data generated in the information processings including the data generated in the parallel data communication between the information processing apparatus and the host computer is temporarily recorded in a volatile memory (cash memory: SDRAM or the like).

The information processing apparatus such as the optical disk apparatus is increasingly advanced in order to respond to new media such as a recording DVD (Digital Versatile Disk) and BD (Blue-ray Disk), as a result of which a whole system is inevitably increasing in its scale. Accordingly, a processing power of a CPU which controls the whole system is inadequate in some cases, possible solutions for which are to increase a speed of the CPU, realize a parallel processing using a plurality of CPUs, and the like. In fact, there exist some information processing apparatuses in which one CPU conventionally controlled the whole system, such as the optical disk apparatus, the whole system is controlled in such a manner that a processing load is divided by the plurality of CPUs in order to respond to more advanced functions in terms of costs and power consumption.

When the information processing apparatus is being manufactured or repaired, the whole program is written in the non-volatile memory of the information processing apparatus from the host-computer side. At the time, in the information processing apparatus, the whole program has not been stored (when manufactured), or an operation of the whole program is incomplete though already stored (when repaired).

As another solution, an information processing apparatus comprising a storage state judging unit for judging whether or not the whole program is stored in the non-volatile memory was invented. In the information processing apparatus, a code for judging whether or not the whole program is stored in the non-volatile memory (for example, check sum code, or the like) is embedded in the whole program of the non-volatile memory so that the storage state judging unit can thereby judge the storage state.

Examples of the conventional information processing apparatus are recited in No. 2001-075796, No. 2000-105694, No. 2000-010666, No. 2002-157137, and No. 2001-243122 of the Publication of the Unexamined Japanese Patent Applications.

As described earlier, when the information processing apparatus is being manufactured or repaired, the whole program has not been stored in the information processing apparatus (when manufactured), or the operation of the whole program is incomplete though already stored (when repaired). In order to deal with the situations in the conventional system in which one CPU is used (hereinafter, referred to as 1-CPU system), there were made available an apparatus configuration and a method wherein the whole program could be transmitted to the information processing apparatus from the host computer through the parallel data communication and easily written in the non-volatile memory in the case where program execution starts in the ROM memory.

In the case of the system in which the plurality of CPUs are used (hereinafter, referred to as plurality-CPU system), however, activation steps and operational states of the respective CPUs affect the operation of the other CPU. Therefore, the following four different problems are generated in terms of the activation step and the operational states of the CPUs in a system (hereinafter, referred to as 2-CPU system) where the CPU comprising the ROM memory (hereafter, referred to as first CPU) and the CPU comprising the non-volatile memory (hereinafter, referred to as second CPU) are used.

The Second CPU is First Activated

When the non-volatile memory is being manufactured or repaired, the second CPU runs away. Then, the whole system is non-operable, which makes it impossible to execute any processing.

The First CPU is First Activated

Because the first CPU is unable to access the non-volatile memory, it becomes impossible to write the whole program in the non-volatile memory, confirm a state where the whole program is being written in the non-volatile memory, and the like.

The First and Second CPUs are Simultaneously Activated

In the case where the second CPU affects the operation of the first CPU, the second CPU runs away, thereby affecting the operation of the first CPU, which makes it impossible to guarantee the operation of the system.

Even in the case where the second CPU does not affect the operation of the first CPU, the first CPU is normally operated, however, unable to grasp the operational state of the second CPU, which also makes it impossible to guarantee the operation of the system.

Neither of the Program of the First CPU Nor the Program of the Second CPU Has Not Been Stored or the Operations of the Programs are Incomplete Though Already Stored When the ROM memory of the first CPU is replaced with a RAM memory during a development process, in particular, the CPU inevitably runs away, which breaks down the system.

Due to the problems described above, an apparatus configuration and a method capable of solving the problems and allowing the whole program to be easily written in the non-volatile memory is desirable also in the plurality-CPU system.

In an optical disk apparatus (information processing apparatus) shown in FIG. 2A as an example of the conventional 1-CPU system, a program (microcode) of a ROM memory (IROM) and a whole program (F/W) of a non-volatile memory (Flash ROM) are processed in a time-sharing manner, which makes it unnecessary for one of the programs to watch an operation of the other program. However, in an optical disk apparatus (information processing apparatus) of the 2-CPU system shown in FIG. 2A according to the present invention, a program (microcode) of a ROM memory (IROM) and a whole program (F/W) of a non-volatile memory (Flash ROM) are independently processed in parallel by two CPUs, which makes it necessary for one of the programs to watch the operation of the other program.

Further, in the case of the method for judging whether or not the whole program is stored in the non-volatile memory using the storage stage judging unit by embedding the code for judging the storage state of the whole program of the non-volatile memory (for example, check sum code, or the like) in the whole program of the non-volatile memory in the information processing apparatus comprising the storage state judging unit for judging the storage state, the code for judging the storage state is embedded at a fixed position in the whole program.

However, when it is undesirable to store the code for judging the storage state at any fixed position in terms of the configuration of the whole program, such a convenience that the whole program has to be reconfigured or some restrictions are imposed on the reconfiguration of the whole program was generated.

Based on the described circumstances, it is desirable to invent such a method that makes it unnecessary to store the code for judging the storage state at any fixed position.

SUMMARY OF THE INVENTION

Therefore, a main object of the present invention is, in a system employing a plurality of CPUs, to be able to easily and unfailingly write a whole program in a non-volatile memory in a speedy manner while preventing the runaway of the CPUs.

Another main object of the present invention is to make it unnecessary to reconfigure the whole program in the case where it is undesirable to fix a storage state judging code for judging whether or not the whole program is stored to a certain position in terms of a configuration of the whole program, or eliminate any restriction in the case of reconfiguring the whole program.

In order to achieve the foregoing objects, the present invention provides the following configurations for an information processing apparatus for executing information processings to communication data obtained through parallel data communication executed between the information processing apparatus and a host computer.

The provided configurations as solutions are different depending on activation steps of a first CPU comprising a ROM memory and a second CPU comprising a non-volatile memory.

The Second CPU is First Activated

An information processing apparatus according to the present invention comprises a communication device for executing the parallel data communication between the information processing apparatus and the host computer, a volatile memory provided for storing the communication data therein, a first controller (CPU) for controlling communication processings of the communication device and information processings to be executed to the communication data stored in the volatile memory, a first ROM memory in which a program of the first controller is previously stored, a second controller (CPU) for controlling the whole apparatus, a non-volatile memory provided for storing a whole program of the second controller therein, a second ROM memory in which another program executable by the second controller is previously stored, and an external input terminal adapted in such a manner that an operational personnel can selectively set if program execution by the second controller starts in the non-volatile memory or in the second ROM memory.

When the information processing apparatus is activated, where the program execution starts is selected in accordance with the setting of the external input terminal.

Further, a rewriting program for the whole program of the non-volatile memory is stored in the second ROM memory.

According to the foregoing configuration, in the case where the whole program has not been stored in the non-volatile memory or an operation of the whole program is incomplete though already stored, the program which can be executed by the second CPU is previously stored in the ROM memory, and the terminal is set when activated so that where the program execution starts can be selected hardware-wise. As a result, the runaway of the second CPU can be prevented.

The foregoing configuration is particularly effective when the second controller first starts the program execution while the first controller remains halted at the time of the activation of the information processing apparatus.

When the rewriting program for the whole program in the non-volatile memory is executed at the time of the activation, the whole program can be easily written in the non-volatile memory.

The foregoing solution according to the invention can be effectively applied to the conventional 1-CPU system.

The First CPU is First Activated

An information processing apparatus according to the present invention comprises a communication device for executing the parallel data communication between the information processing apparatus and the host computer, a volatile memory provided for storing the communication data therein, a first controller (CPU) for controlling communication processings of the communication device and information processings to be executed to the communication data stored in the volatile memory, a ROM memory in which a program of the first controller is previously stored, a second controller (CPU) for controlling the whole apparatus, a non-volatile memory provided for storing a whole program of the second controller therein, a first register in which if program execution starts in the non-volatile memory or in the volatile memory can be selectively set by the program of the first controller when the second controller is reset (when the execution starts), and a second register in which an execution-start instruction for the second controller can be set by the program of the first controller.

A program which can be executed by the second controller is previously installed in the ROM memory.

The program which can be executed by the second controller is previously installed in the volatile memory sharable by the first and second controllers.

The first controller switches from the setting by the first register to the setting by the second register so that the second controller starts the program execution.

Further, a rewriting program for the whole program of the non-volatile memory is previously installed in the volatile memory sharable by the first and second controllers.

According to the foregoing configuration, in the case where the whole program has not been stored in the non-volatile memory or the operation of the whole program is incomplete though already stored, the sharable volatile memory which allows the program execution by the first and second CPUs is provided, and the program which can be executed by the second CPU is stored in the volatile memory so that the second CPU is activated to execute the program in order to use a hardware resource of the second CPU. Where the program execution by the second CPU starts is selected by the setting of the register, and the like. Thereby, the runaway of the second CPU can be prevented. Further, the rewriting program for the whole program in the non-volatile memory is installed in the ROM memory and executed so that the whole program can be easily written in the non-volatile memory.

The First and Second CPUs are Simultaneously Activated

An information processing apparatus according to the present invention comprises a communication device for executing the parallel data communication between the information processing apparatus and the host computer, a volatile memory provided for storing the communication data therein, a first controller (CPU) for controlling communication processings of the communication device and information processings to be executed to the communication data stored in the volatile memory, a first ROM memory in which a program of the first controller is previously stored, a second controller (CPU) for controlling the whole apparatus, a non-volatile memory provided for storing a whole program of the second controller therein, a second ROM memory in which another program executable by the second controller is previously stored, and a register in which if program execution starts in the non-volatile memory or in the second ROM memory can be selectively set by the program of the first controller when the second controller is reset.

An information indicating an operational state of the second controller is set in the volatile memory sharable by the first and second controllers.

The first controller reads the information indicating the operational state of the second controller so that the operational state of the second controller can be monitored.

The first controller changes the setting of the register in accordance with the operational state of the second controller to thereby reset the second controller, so that where the program execution by the second controller starts is changed.

A rewriting program for the whole program of the non-volatile memory is further stored in the second ROM memory.

According to the foregoing configuration, in the case where the whole program has not been stored in the non-volatile memory or the operation of the whole program is incomplete though already stored, the first CPU can monitor the operational state of the second CPU even if the second CPU runs away in the case where the second CPU does not affect the operation of the first CPU. When the second CPU is judged to be in the runaway state, where the program execution by the second CPU starts is changed so that the program on the ROM memory can be executed, and the second CPU is reset. Accordingly, the operation of the whole system can be guaranteed.

Further, after the second CPU is reset, the rewriting program for the whole program of the non-volatile memory is executed so that the operation of the whole system can be recovered. Further, the whole program can be easily written in the non-volatile memory.

An information processing apparatus according to the present invention comprises a communication device for executing the parallel data communication between the information processing apparatus and the host computer, a volatile memory provided for storing the communication data therein, a first controller (CPU) for controlling communication processings of the communication device and information processings to be executed to the communication data stored in the volatile memory, a ROM memory in which a program of the first controller is previously stored, a second controller (CPU) for controlling the whole apparatus, and a non-volatile memory provided for storing a whole program of the second controller therein.

The information processing apparatus further comprises an external input terminal adapted in such a manner that an operational personnel can set whether or not the execution of the whole program by the second controller starts.

When the information processing apparatus is activated, it is selected whether or not the execution of the whole program by the second controller starts depending on the setting of the external input terminal.

Further, the first controller executes the rewriting program for the whole program of the non-volatile memory.

According to the foregoing configuration, in the case where the whole program has not been stored in the non-volatile memory or the operation of the whole program is incomplete though already stored and the second CPU affects the operation of the first CPU, whether or not the second CPU starts the execution of the whole program can be selected depending on the setting of the terminal when activated. Therefore, the runaway of the second CPU, which affects the operation of the first CPU, can be prevented. Further, the first CPU executes the rewriting program for the whole program so that the whole program can be easily written in the non-volatile memory in the same manner as in the case where the first CPU is first activated.

The foregoing configuration is particularly effective in the case where the first controller and the second controller simultaneously start the program execution and the operational state of the second controller affects the operation of the first controller when the information processing apparatus is activated.

Further, the second CPU can start the program execution when activated in the case where the whole program is stored in the non-volatile memory because whether or not the second CPU starts the execution of the whole program can be selected.

Neither of the Program of the First CPU Nor the Program of the Second CPU Has Not Been Stored or the Operation of the Programs are Incomplete Though Already Stored An information processing apparatus according to the present invention comprises a communication device for executing the parallel data communication between the information processing apparatus and the host computer, a volatile memory provided for storing the communication data therein, a first controller (CPU) for controlling communication processings of the communication device and information processings to be executed to the communication data stored in the volatile memory, a first ROM memory in which a program of the first controller is previously stored, a second controller (CPU) for controlling the whole apparatus, a non-volatile memory provided for storing a whole program of the second controller therein, a second ROM memory in which another program executable by the first controller or the second controller is previously stored, a first external input terminal adapted in such a manner that an operational personnel can selectively set if program execution by the first controller or the second controller starts in the first ROM memory or in the second ROM memory, or in the non-volatile memory or in the second ROM memory, and a second external input terminal adapted in such a manner that the operational personnel can set whether or not the program execution by the first controller or the second controller starts.

Where the program execution starts is selected in accordance with the setting of the first external input terminal when the information processing apparatus is activated.

Whether or not the program execution starts is selected in accordance with the setting of the second external input terminal when the information processing apparatus is activated.

Further, a rewriting program for the whole program of the non-volatile memory is stored in the second ROM memory.

According to the foregoing configuration, in the case where the whole program has not been stored in the non-volatile memory or the operation of the whole program is incomplete though already stored and the second CPU affects the operation of the first CPU and in the case where the ROM memory of the first CPU is replaced with a RAM memory in a development process, and the like, the another program executable by the first CPU or the second CPU is stored in the another ROM memory, where the program execution starts can be selected hardware-wise in such a manner that the terminal is set, and whether or not the program execution by the first CPU or the second CPU starts is selected in such a manner that the terminal is set when activated. Accordingly, the first CPU or the second CPU can be prevented from running away, and the operation of one of the CPUs is prevented from affecting the operation of the other. Further, the rewriting program for the program executed the first CPU or the second CPU is stored in the ROM memory and executed so that the whole program can be easily written in the non-volatile memory.

Further, where the program execution starts can be selected so that the first CPU and the second CPU can normally execute the program execution when activated in the case where the programs are stored in the ROM memory and the non-volatile memory in mass production.

According to the present invention, the four different problems described so far can be solved, and the runaway of the CPU can be prevented and the whole program can be easily and unfailingly written in the non-volatile memory in a speedy manner in the system employing the plurality of CPUs.

In order to solve the problem that it is undesirable to store the storage state judging code at any fixed position in terms of the configuration of the whole program, the information processing apparatus according to the present invention for executing the information processings to the communication data obtained though the parallel data communication between the information processing apparatus and the host computer is configured as follows.

In the information processing apparatus, the rewriting program for the whole program stored in the non-volatile memory comprises a storage state judging unit for judging a storage state of the non-volatile memory.

The storage state judging unit makes a judgment by comparing a fixed code (or fixed value) previously memorized as ROM in the storage state judging unit to a code generated by means of a calculating formula preset with respect to the whole program stored in the non-volatile memory.

According to the present invention, the fixed code is previously memorized as ROM in the case where it is undesirable in terms of the configuration of the whole program to fix the storage state judging code for judging the storage state of the whole program, which, therefore, makes it unnecessary to reconfigure the whole program. Further, any limitation can be avoided even if the whole program is reconfigured.

The storage state judging unit preferably judges only a partial region of the non-volatile memory previously specified. Thereby, a length of time required for the storage state judging unit to make the judgment can be reduced to a minimum necessary level, which increases a speed of the control operation.

The foregoing judging method according to the present invention is not only effectively applied to the information processing apparatus of the 2-CPU system such as the optical disk apparatus, but is also widely and effectively applicable to a constitution comprising a rewritable memory such as the non-volatile memory wherein, a storage state of the memory is judged, in an effective manner.

"when activated" refers to a time point when a power supply of the information processing apparatus is turned off and the apparatus is then reactivated (the power supply is turned on again), and a time point when the information processing apparatus with the power supply remaining ON is reset on software.

A method for writing the communication data obtained through the parallel data communication between the information processing apparatus and the host computer in the non-volatile memory according to the present invention is constituted as follows.

The Second CPU is First Activated

A data writing method according to the present invention comprises a step for preparing a communication device for executing the parallel data communication between the information processing apparatus and the host computer, a step for preparing a volatile memory provided for storing the communication data therein, a step for preparing a first controller (CPU) for controlling communication processings of the communication device and information processings to be executed to the communication data stored in the volatile memory, a step for preparing a first ROM memory in which a program of the first controller is previously stored, a step for preparing a second controller (CPU) for controlling the whole apparatus, a step for preparing a non-volatile memory provided for storing a whole program of the second controller therein, a step for preparing a second ROM memory in which another program executable by the second controller is previously stored, a step for preparing an external input terminal adapted in such a manner that an operational personnel can selectively set if program execution by the second controller starts in the non-volatile memory or in the second ROM memory, a first step for judging if the program execution by the second controller starts in the non-volatile memory or in the second ROM memory depending on the setting of the external input terminal, and a second step for judging that the program execution by the second controller starts in the second ROM memory and executing the another executable program stored in the second ROM memory different to the program of the non-volatile memory.

A rewriting program for the whole program is executed in the second step.

According to the present invention, when the rewriting program for the whole program is executed, the first controller is activated so that the communication program is executed. Accordingly, when the method for transmitting the whole program from the host computer to the information processing apparatus through the parallel data communication and easily writing the whole program in the non-volatile memory, or the like, is adopted in the 1-CPU system already invented, the whole program of the non-volatile memory can be rewritten.

Further, the foregoing method is particularly effectively applied to a case where the first controller remains halted, and the second controller starts the program execution when the information processing apparatus is activated.

The First CPU is First Activated

A data writing method according to the present invention comprises a step for preparing a communication device for executing the parallel data communication between the information processing apparatus and the host computer, a step for preparing a volatile memory provided for storing the communication data therein, a step for preparing a first controller (CPU) for controlling communication processings of the communication device and information processings to be executed to the communication data stored in the volatile memory, a step for preparing a ROM memory in which a program of the first controller is previously stored, a step for preparing a second controller (CPU) for controlling the whole apparatus, a step for preparing a non-volatile memory provided for storing a whole program of the second controller therein, a step for preparing a first register in which if program execution starts in the non-volatile memory or in the volatile memory when the second controller is reset (when the execution starts) can be selectively set by the program of the first controller, a step for preparing a second register in which an execution-start instruction for the second controller can be set by the program of the first controller, a first step in which the first controller stores (copies) the program executable by the second controller previously installed in the first ROM memory in the volatile memory sharable by the first and second controllers, a second step in which the first controller sets the volatile memory in the setting of the first register in which if the program execution starts in the non-volatile memory or in the volatile memory when reset (when the execution starts) can be selectively set by the program of the first controller, a third step in which the first controller sets the second register in which the execution-start instruction for the second controller can be set by the program of the first controller so that the second controller starts the program execution, and a fourth step in which the second controller executes the program stored in the volatile memory.

Further, a rewriting program for the whole program of the non-volatile memory executable by the second controller is previously installed in the first ROM memory in the first step, and the rewriting program for the whole program of the non-volatile memory is executed in the fourth step.

According to the present invention, when the rewriting program for the whole program is executed, the communication program of the first controller is utilized. Accordingly, when the method for transmitting the whole program from the host computer to the information processing apparatus through the parallel data communication and easily writing the whole program in the non-volatile memory, or the like, is adopted in the 1-CPU system already invented, the whole program of the non-volatile memory can be rewritten.

The First and Second CPUs are Simultaneously Activated

A data writing method according to the present invention comprises a step for preparing a communication device for executing the parallel data communication between the information processing apparatus and the host computer, a step for preparing a volatile memory provided for storing the communication data therein, a step for preparing a first controller (CPU) for controlling communication processings of the communication device and information processings to be executed to the communication data stored in the volatile memory, a step for preparing a first ROM memory in which a program of the first controller is previously stored, a step for preparing a second controller (CPU) for controlling the whole apparatus, a step for preparing a non-volatile memory provided for storing a whole program of the second controller therein, a step for preparing a second ROM memory in which another program executable by the second controller is previously stored, a step for preparing a register in which if program execution starts in the non-volatile memory or in the second ROM memory when the second controller is reset can be selectively set by the program of the first controller, a first step for monitoring an operational state of the second controller in such a manner that the first controller reads an information indicating the operational state of the second controller set in the volatile memory sharable by the first and second controllers, a second step in which the first controller judges the operational state of the second controller, a third step in which the first controller sets the second ROM memory in the setting of the register in which if the program execution starts in the non-volatile memory or in the second ROM memory when the second controller is reset can be selectively set by the program of the first controller when the second controller is judged to be in a runaway state, a fourth step in which the first controller resets the second controller, and a fifth step in which the second controller executes the program stored in the second ROM memory.

Further, a rewriting program for the whole program of the non-volatile memory is executed in the fifth step.

According to the present invention, when the rewriting program for the whole program is executed, the communication program of the first controller is utilized. Accordingly, when the method for transmitting the whole program to the information processing apparatus from the host computer through the parallel data communication and easily writing the whole program in the non-volatile memory, or the like, is adopted in the 1-CPU system already invented, the whole program of the non-volatile memory can be rewritten.

A data writing method according to the present invention comprises a step for preparing a communication device for executing the parallel data communication between the information processing apparatus and the host computer, a step for preparing a volatile memory provided for storing the communication data therein, a step for preparing a first controller (CPU) for controlling communication processings of the communication device and information processings to be executed to the communication data stored in the volatile memory, a step for preparing a ROM memory in which a program of the first controller is previously stored, a step for preparing a second controller (CPU) for controlling the whole apparatus, a step for preparing a non-volatile memory provided for storing a whole program of the second controller therein, a step for preparing an external input terminal adapted in such a manner that an operational personnel can set whether or not execution of the whole program of the second controller starts, a first step for preventing the execution of the whole program of the second controller based on the setting of the external input terminal, and a second step for executing the program stored in the ROM memory.

Further, a rewriting program for the whole program of the non-volatile memory is executed in the second step.

According to the present invention, when the rewriting program for the whole program is executed, the method for writing the whole program in the case where the first CPU is first activated is adopted, and the method for transmitting the whole program to the information processing apparatus from the host computer through the parallel data communication and easily writing the whole program in the non-volatile memory, or the like, is adopted in the 1-CPU system already invented, so that the whole program of the non-volatile memory can be rewritten.

The foregoing method is particularly effective in the case where the first and second controllers simultaneously start the program execution and the operational state of the second controller affects the operation of the first controller when the information processing apparatus is activated.

Neither of the Program of the First CPU Nor the Program of the Second CPU is Stored or the Operations of the Programs are Incomplete Though Already Stored A data writing method according to the present invention comprises a step for preparing a communication device for executing the parallel data communication between the information processing apparatus and the host computer, a step for preparing a volatile memory provided for storing the communication data therein, a step for preparing a first controller (CPU) for controlling communication processings of the communication device and information processings to be executed to the communication data stored in the volatile memory, a step for preparing a first ROM memory in which a program of the first controller is previously stored, a step for preparing a second controller (CPU) for controlling the whole apparatus, a step for preparing a non-volatile memory provided for storing a whole program of the second controller therein, a step for preparing a second ROM memory in which another program executable by the first controller or the second controller is previously stored, a step for preparing a first external input terminal adapted in such a manner that an operational personnel can selectively set if program execution by the first controller or the second controller starts in the first ROM memory or in the second ROM memory, or in the non-volatile memory or in the second ROM memory, a step for preparing a second external input terminal adapted in such a manner that the operational personnel can set whether or not program execution by the first controller or the second controller starts, a first step for preventing the program execution by the first controller based on the setting of the second external input terminal, a second step for judging if program execution by the second controller starts in the non-volatile memory or in the second ROM memory based on the setting of the first external input terminal, and a third step for executing the program stored in the second ROM memory when it is judged that the program execution by the second controller starts in the second ROM memory.

Further, the whole program of the non-volatile memory and a rewriting program in the first ROM memory (RAM memory in the development process) are executed in the third step.

According to the present invention, when the rewriting program for the whole program is executed, the communication program and the like previously stored in the non-volatile memory and the like are stored in the first ROM memory (RAM memory in the development process), and the first controller is activated so that the communication program is utilized. Accordingly, when the method for transmitting the whole program to the information processing apparatus from the host computer through the parallel data communication and easily writing the whole program in the non-volatile memory, or the like, is adopted in the 1-CPU system already invented, the whole program of the non-volatile memory can be rewritten.

An information processing apparatus for executing information processings to the communication data obtained through the parallel data communication between the information processing apparatus and the host computer according to the present invention is configured as follows.

An information processing apparatus according to the present invention comprises a communication device for executing the parallel data communication between the information processing apparatus and the host computer, a volatile memory provided for storing the communication data therein, and a controller for controlling communication processings of the communication device and information processings to be executed to the communication data stored in the volatile memory.

The controller comprises a data storing unit in which a communication program of the communication device is previously stored in a non-volatile state, and a data movement controller for moving the communication program from the data storing unit to the volatile memory and executing the communication program on the volatile memory.

According to the foregoing configuration, even in the case where the information processings of the information processing apparatus are cannot be executed on software, the parallel data communication can be executed between the information processing apparatus and the host computer because the communication program of the communication device is executed on the volatile memory.

Further, only the communication program, which is a minimum necessary data for the communication between the information processing apparatus and the host computer, is stored in the data storing unit. Therefore, a capacity of the data storing unit can be minimized, which reduces costs. The costs can be further reduced since it is unnecessary to make any change to hardware.

Further, when data to be written in a non-volatile memory and a program for writing the data in the non-volatile memory are downloaded from the host computer, a wide variety of data (whole program of the information processing apparatus and the like) can be written in the non-volatile memory without largely increasing the apparatus configuration.

The effect of the present invention is more obviously exerted in the information processing apparatus further comprising a non-volatile memory provided for storing therein a whole program of the information processing apparatus including a program equal to the communication program, wherein the communication program provided separately from the whole program is previously stored in the data storing unit. In the information processing apparatus, in general, none of the information processings including the communication with the host computer can be executed in the case where a main program for executing main processings (information processings) is not stored in the information processing apparatus, or the main program is problematic though already stored. In contrast to the disadvantage, according to the present invention, the parallel data communication can be executed between the information processing apparatus and the host computer so that the whole program can be downloaded even though the whole program is not stored in the complete state, as described earlier.

The effect of the present invention can be more obviously exerted in the information processing apparatus wherein the processing of the data movement controller is executed when the information processing apparatus is activated. "When the information processing apparatus is activated" refers to a time point when the power supply of the information processing apparatus is turned off and the apparatus is reactivated (the power supply is turned on again) and a time point when the information processing apparatus with the power supply remaining ON is reset on software.

The controller preferably further comprises a storage judging unit for judging whether or not the whole program is stored in the non-volatile memory when the information processing apparatus is activated, and the data movement controller preferably executes the whole program on the non-volatile memory in the case where the storage judging unit judges that the whole program is stored in the non-volatile memory when the information processing apparatus is activated, and executes the processing of the data movement controller in the case where the storage judging unit judges that the whole program is not stored in the non-volatile memory when the information processing apparatus is activated. Accordingly, the communication program is executed on the volatile memory so that the parallel data communication is realized only in the state where the whole program is not stored, which increases the speed of the control operation.

The information processing apparatus preferably further comprises an external input terminal adapted in such a manner that the operational personnel can set whether or not the judgment processing by the storage judging unit is executed, and the data movement controller preferably reads the setting of the external input terminal to thereby change the control state when the information processing apparatus is activated. Accordingly, the control operation in accordance with the setting of the external input terminal can be appropriately executed, which increases the speed of the control operation.

The data movement controller preferably reads the setting of the external input terminal to thereby set the control state and rewritably records the setting of the external input terminal in the volatile memory when the power supply of the information processing apparatus is turned off and the apparatus is reactivated, and does not read the setting of the external input terminal but reads the setting of the external input terminal from the volatile memory to thereby set the control state when the information processing apparatus with the power supply remaining ON is reactivated on software.

The controller preferably further comprises a state judging unit for judging a recoding state of the non-volatile memory when the information processing apparatus is activated, and the data movement controller preferably judges that the whole program is stored in the non-volatile memory in a normal recording state when the state judging unit judges that the recording state is normal and accordingly executes the whole program on the non-volatile memory, and executes the processing of the data movement controller when the state judging unit judges that the recording state is abnormal. Accordingly, the control operation in accordance with the judgment result of the state judging unit can be appropriately executed, which increases the speed of the control operation.

The state judging unit preferably judges only a partial region of the non-volatile memory previously specified. Accordingly, a length of time required for the judgment made by the state judging unit is reduced to a minimum necessary level, which increases the speed of the control operation.

The state judging unit preferably judges only the state of the whole program stored in the non-volatile memory. Accordingly, the length of time required for the judgment made by the state judging unit is reduced to a minimum necessary level, which increases the speed of the control operation.

The information processing apparatus preferably further comprises an external input terminal adapted in such a manner that the operational personnel can set whether or not the judgment processing by the state judging unit is executed, and the data movement controller preferably reads the setting of the external input terminal to thereby change the control state when the information processing apparatus is activated. Accordingly, the judgment processing is executed by the state judging unit only when the operational personnel judges that the judgment processing by the state judging unit is necessary, which increases the speed of the control operation.

The data movement controller preferably reads the setting of the external input terminal to thereby set the control state and rewritably records the setting of the external input terminal in the volatile memory when the power supply of the information processing apparatus is turned off and the apparatus is reactivated, and does not read the setting of the external input terminal but reads the setting of the external input terminal from the volatile memory to thereby set the control state when the information processing apparatus with the power supply remaining ON is reactivated on software. Thereby, the setting of the external input terminal different to the actual setting of the external input terminal can be recorded in the volatile memory. In the foregoing manner, when the information processing apparatus with the power supply remaining ON is reactivated on software, the control state of the controller can be set from the recording contents of the volatile memory.

The controller preferably comprises an authenticating unit for inspecting whether or not a preset authentication data is attached to the data transmitted from the host computer, and the data movement controller preferably executes the processing of the data movement controller when the authenticating unit judges that the authentication data is attached.

As is clear from the foregoing description, the information processing apparatus according to the present invention preferably executes the communication program on the volatile memory using the data movement controller to thereby transmit the whole program and a program for writing the whole program from the volatile memory into the non-volatile memory from the host computer to the volatile memory, and operates the transmitted writing program on the volatile memory to thereby write the whole program in the non-volatile memory.

The communication program preferably inspects a communication result per a certain volume of data, and continues the communication only when a result of the inspection shows normality.

A method for temporarily recording the communication data obtained through the parallel data communication between the information processing apparatus and the host computer in a volatile memory and writing the temporarily recorded data in a non-volatile memory according to the present invention is constituted as follows.

The data writing method comprises a first step for retaining a communication program for the parallel data communication between the information processing apparatus and the host computer in a non-volatile state apart from the storage in non-volatile memory, writing the retained communication program in the volatile memory and executing the written communication program on the volatile memory, a second step for receiving a program for writing the communication program from the volatile memory into the non-volatile memory and the communication data from the host computer by executing the communication program on the volatile memory, and a third step for writing the communication data from the volatile memory into the non-volatile memory by executing the writing program on the volatile memory.

According to the present invention, the communication program is executed on the volatile memory so that the parallel data communication state can be realized between the information processing apparatus and the host computer.

The data writing method preferably further comprises a storage judging step for judging whether or not data is stored in the non-volatile memory prior to the first step, wherein the first through third steps are executed when the storage judging step judges data abnormality. Accordingly, the control operation in accordance with the judgment result of the storage judging step can be appropriately executed, which increase the speed of the control operation.

The data writing method preferably further comprises a state judging step for judging a state of the data stored in the non-volatile memory prior to the first step, wherein the first through third steps are executed when the state judging step judges data abnormality. Accordingly, the control operation in accordance with the judgment result of the state judging step can be appropriately executed, which increase the speed of the control operation.

Only a partial region of the non-volatile memory previously specified is preferably judged in the state judging step. Accordingly, a length of time required for the state judging step can be reduced to a minimum necessary level, which increases the speed of the control operation.

Only a region of the non-volatile memory currently used is preferably judged in the state judging step. Accordingly, the length of time required for the state judging step can be reduced to a minimum necessary level, which increases the speed of the control operation.

The data writing method preferably further comprises an authenticating step for inspecting whether or not a preset authentication data is attached to data transmitted from the host computer prior to the second step, wherein the second and third steps are executed when the authenticating step judges that the authentication data is attached. Accordingly, any inappropriate data from a false host computer cannot be downloaded into the information processing apparatus.

The communication result is preferably inspected per a certain volume of data so that the communication is continued only when a result of the inspection shows normality in the second step. Accordingly, any downloading failure can be surely prevented during the downloading process.

BRIEF DESCRIPTION OF THE DRAWINGS

These and other objects as well as advantages of the invention will become clear by the following description of preferred embodiments of the invention. A number of benefits not recited in this specification will come to the attention of the skilled in the art upon the implementation of the present invention.

DETAILED DESCRIPTION OF THE INVENTION

Figure 1:
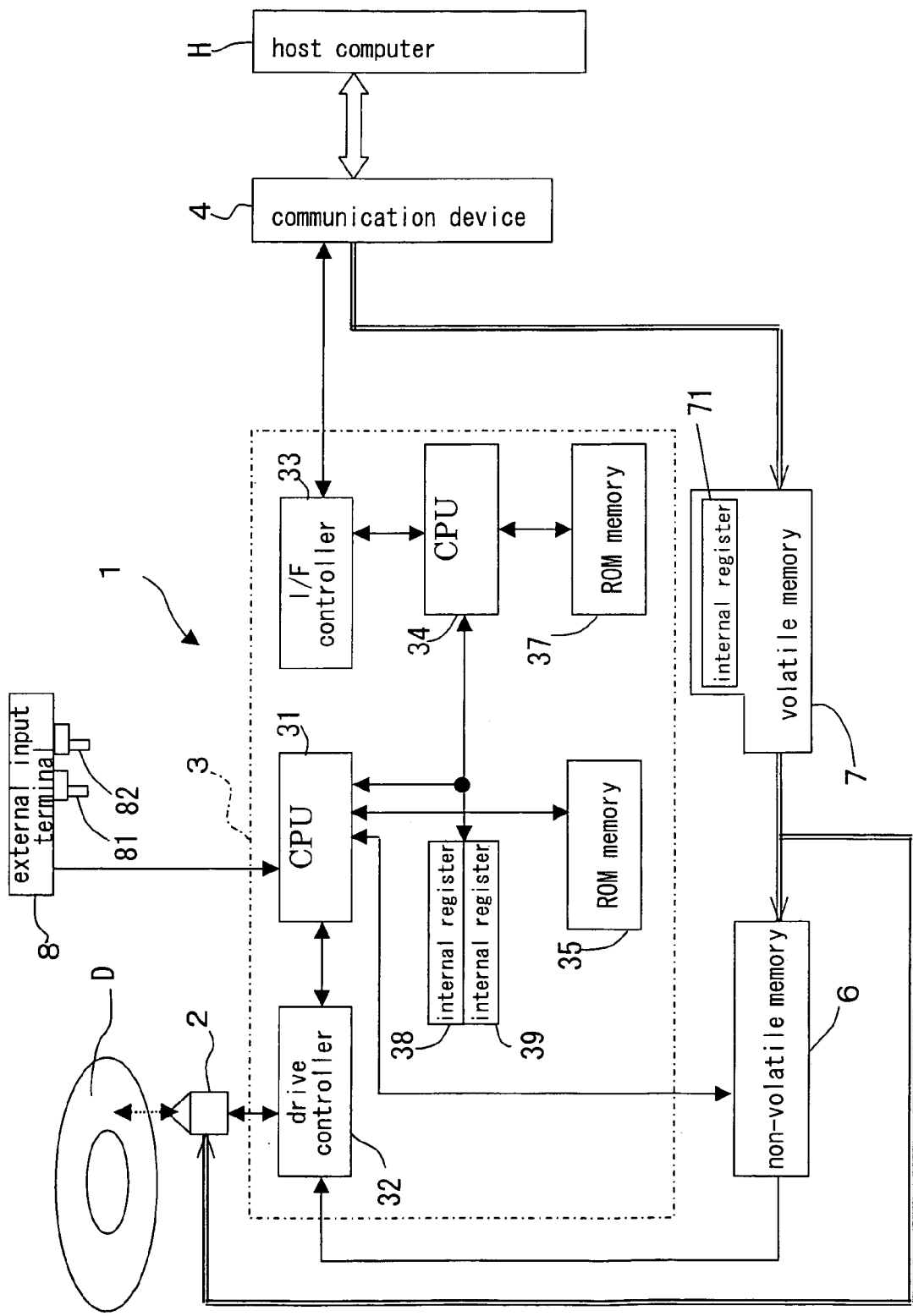
FIG. 1 is a block diagram illustrating a configuration of an optical disk apparatus according to a first preferred embodiment of the present invention.
Figure 2A:
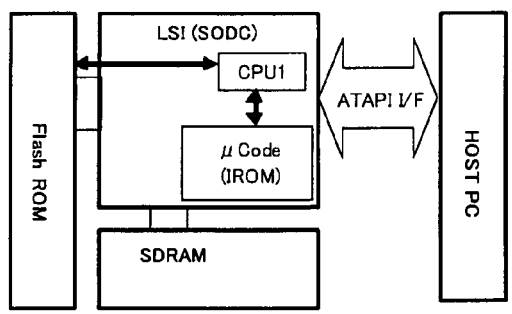
FIGS. 2 are block diagrams illustrating configurations of optical disk apparatuses of a 1-CPU system and a 2-CPU system, which shows problems to be solved by the present invention.
Figure 2B:
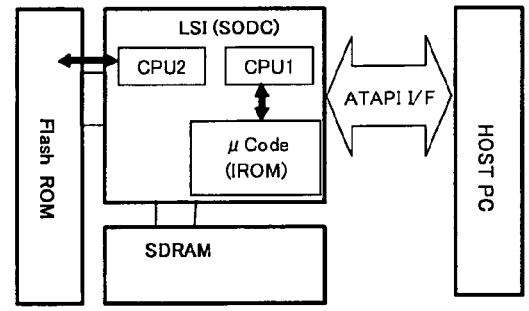

Hereinafter, preferred embodiments of the present invention are described referring to the drawings.

First Preferred Embodiment

FIG. 1 is a block diagram illustrating a configuration of an optical disk apparatus according to a first preferred embodiment of the present invention. In FIG. 1, arrows each having a single line shows a flow of a control operation, and arrows each having two lines shows a data flow.

An optical disk apparatus 1 executes such information processings that a communication data received via parallel data communication between the optical disk apparatus and a host computer H is written in an optical disk D, and the data read from the optical disk D is transmitted to the host computer H through the parallel data communication.

The optical disk apparatus 1 comprises an optical disk driving device 2, an optical disk controller 3, a communication device 4, a non-volatile memory 6, a volatile memory 7, and an external input terminal 8. In the optical disk apparatus 1, the optical disk controller 3 is controlled by software executed by two CPUs incorporated in the optical disk apparatus The optical disk driving device 2 reads and writes the data with respect to the optical disk D via an optical pickup (not shown). The communication device 4 executes the parallel data communication between the optical disk apparatus and the host computer H. The optical disk apparatus 1 executes the parallel data communication based on the ATAPI (Attachment Packet Interface) Standard which is a type of the parallel data communication, however, may execute the communication based on other parallel data communication standards.

The non-volatile memory 6 comprises a so-called flash ROM, and is a recorder in which a whole program (so-called firmware) of the optical disk apparatus 1 is stored in a non-volatile state (state where the whole program is not extinguished when a power supply is turned off). The whole program includes a driving program for the optical disk driving device 2.

The whole program is executed by a CPU 31 incorporated in the optical disk controller 3.

A communication program of the communication device 4 is stored in a built-in ROM memory 37 incorporated in the optical disk controller 3 and executed by a CPU 34 incorporated in the optical disk controller 3.

The volatile memory 7 comprises a SDRAM or the like, and is a volatile (extinguished when the power supply is turned off) recorder in which the communication data communicated between the optical disk apparatus and the host computer H via the communication device 4 is temporarily recorded (buffered). The volatile memory 7 buffers the communication data during normal operations of the optical disk apparatus 1.

An internal register 71 is present on the volatile memory 7 sharable by the CPU 31 and the CPU 34 and includes an information indicating an operational state of the CPU 31.

The optical disk controller 3 is a control device for controlling the whole optical disk apparatus 1, and comprises the CPU 31, a drive controller 32, an interface controller 33, the CPU 34, a ROM memory 35, the ROM memory 37, and internal registers 38 and 39.

The CPU 31 commands and controls the whole optical disk apparatus 1. The drive controller 32 drive-controls the optical disk driving device 2 based on an instruction of the CPU 31. The CPU 34 executes the communication program of the communication device 4 stored in the ROM memory 37, and the like. The interface controller 33 controls a communication protocol of the parallel data communication (ATAPI communication) executed by the communication device 4 based on an instruction of the CPU 34. In the ROM memory 35, for example, a rewriting program for the whole program of the non-volatile memory 6, a program comprising a function as a storage state judging unit for judging whether or not the data (whole program of the optical disk apparatus 1 and the like) is stored in the non-volatile memory 6, and the like, are stored. In the ROM memory 37, the communication program of the communication device 4 and the like are stored. The internal registers 38 and 39 comprises a function capable of selectively setting if program execution starts in the non-volatile memory 6 or in the volatile memory 7 when the CPU 31 (or CPU 34) is reset (when the program execution starts) by the program of the CPU 34, or a function capable of setting an execution-start instruction for the CPU 31 (or CPU 34) by the program of the CPU 34 (or CPU 31).

The external input terminal 8 is a hardware switch comprising, for example, a setting switch 81 and a setting switch 82. When an operational personnel of the optical disk apparatus 1 switches to and from ON and OFF of the setting switches 81 and 82, where the program execution by the CPU 31 or the CPU 34 incorporated in the optical disk controller 3 starts or whether or not the execution starts can be selectively set.

Below is described a data (whole program) writing operation (writing control method) with respect to the non-volatile memory 6 in the optical disk apparatus 1.

In the case of the optical disk apparatus 1 of the 2-CPU system, activation steps and operational states of the CPUs affect the operation of the other CPU in the state where the whole program has not been stored in the non-volatile memory 6 or an operation of the whole program is problematic though already stored. Therefore, it is not possible to operate the whole program and thereby download the whole program from the host computer H. As a solution for dealing with the disadvantage, the whole program is downloaded from the host computer H and installed in the non-volatile memory 6 as follows.

The operation of writing the whole program executed by the optical disk apparatus 1 refers to an operation of writing a new whole program in the non-volatile memory 6 in the state where the whole program of the optical disk apparatus 1 has not been stored in the non-volatile memory 6 during a manufacturing process of the optical disk apparatus 1 and an operation of updating the whole program in the non-volatile memory 6 when the optical disk apparatus 1 whose whole program is problematic is being repaired. Therefore, the writing operation includes an operation of judging whether or not the stored whole program is undergoing any defect and an operation of updating the defective whole program into a normal whole program.

In the optical disk apparatus 1, the whole program writing operation is executed when the optical disk apparatus 1 is reset. The reset (activation) of the optical disk apparatus 1 includes a reset implemented when a power supply of the optical disk apparatus 1 is turned off (OFF) and the apparatus is reactivated (ON) (hereinafter, referred to as hardware reset), and a reset implemented by the whole program of the non-volatile memory 6 or the host computer H software-wise with the power supply of the optical disk apparatus 1 remaining ON (hereinafter, referred to as software reset).

Prior to the description of the whole program writing operation, the setting of the external input terminal 8 is described. The external input terminal 8 is provided with the ON/OFF setting switches 81 and 82. The setting switch 81 selectively sets where the program execution by the CPU 31 or the CPU 34 incorporated in the optical disk apparatus 3 starts. The setting switch 82 selectively sets whether or not the program execution by the CPU 31 or the CPU 34 starts.

When the whole program is written, the operational personnel of the optical disk apparatus 1 (person in charge of manufacturing in the present case) previously sets the setting switches 81 and 82 as follows.

The setting switch 81 is set so that the program execution by the CPU 31 starts in the ROM memory 35 (or volatile memory 7).

The setting switch 82 is set so that the program execution by the CPU 31 does not start.

After the external input terminal 8 is set in the foregoing manner, the whole program writing operation is executed. The start of the writing operation is triggered by the reset of the optical disk apparatus 1 in terms of the control operation.

The CPU 31 is First Activated

Referring to the respective components in comparison to claims 1-3 and 23-25, the CPU 34 corresponds to a first controller, the ROM memory 37 corresponds to a first ROM memory, the CPU 31 corresponds to a second controller, and the ROM memory 35 corresponds to a second ROM memory.

Figure 4:
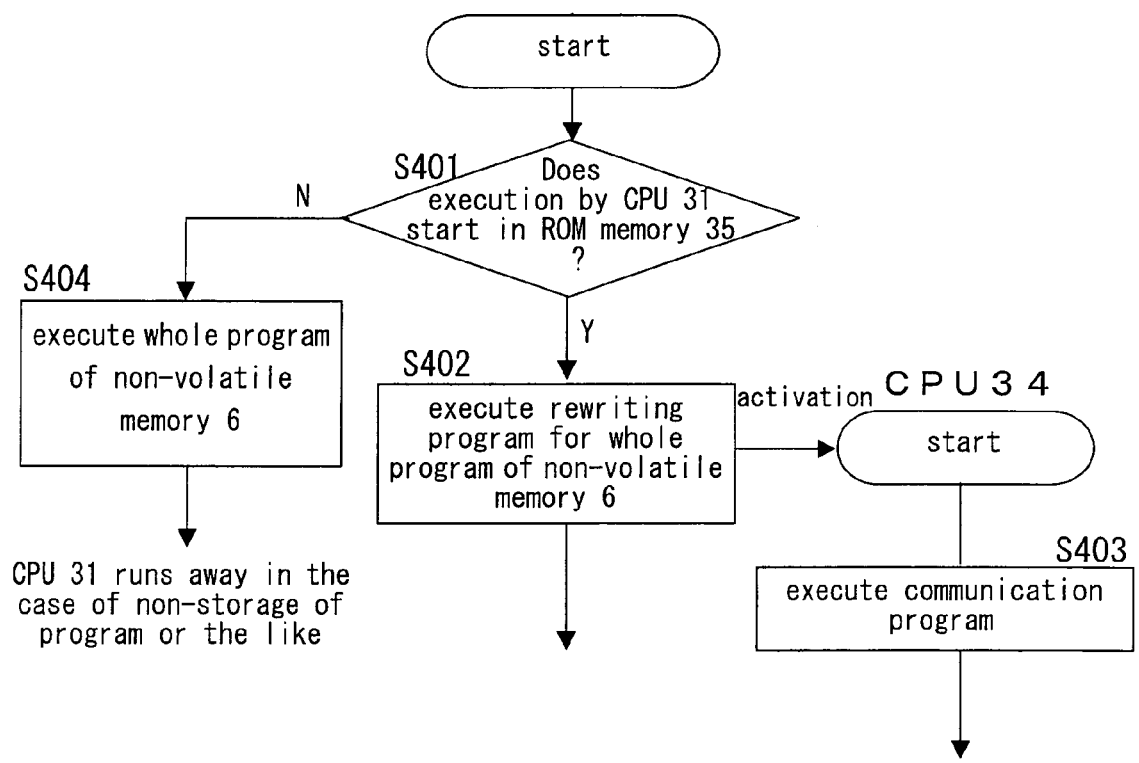
FIG. 4 is a flow chart of a first operation of a writing operation of the optical disk apparatus according to the first preferred embodiment.

The whole program writing operation executes steps shown in a flow chart of FIG. 4.

First, the optical disk controller 3 judges if the program execution by the CPU 31 starts in the non-volatile memory 6 or in the ROM memory 35 (S401) based on the setting of the setting switch 81 of the external input terminal 8. When it is judged that the program execution by the CPU 31 starts in the ROM memory 35, the rewriting program for the whole program of the non-volatile memory 6 stored in the ROM memory 35 is executed (S402). When it is judged that the program execution by the CPU 31 starts in the non-volatile memory 6 in S401, the whole program of the non-volatile memory 6 is executed (S404). Then, the CPU 31 runs away if the program has not been stored.

When the CPU 34 is activated by the rewriting program so that the communication program is executed (S403), the method for transmitting the whole program from the host computer H to the information processing apparatus through the parallel data communication and easily writing the whole program in the non-volatile memory 6, or the like, is adopted in the 1-CPU system already invented, the whole program of the non-volatile memory 6 can be rewritten.

The CPU 34 is First Activated

Referring to the respective components in comparison to claims 4, 5, 26 and 27, the CPU 34 corresponds to a first controller, the CPU 31 corresponds to a second controller, the internal register 38 corresponds to a first register, and the internal register 39 corresponds to a second register.

Figure 5:
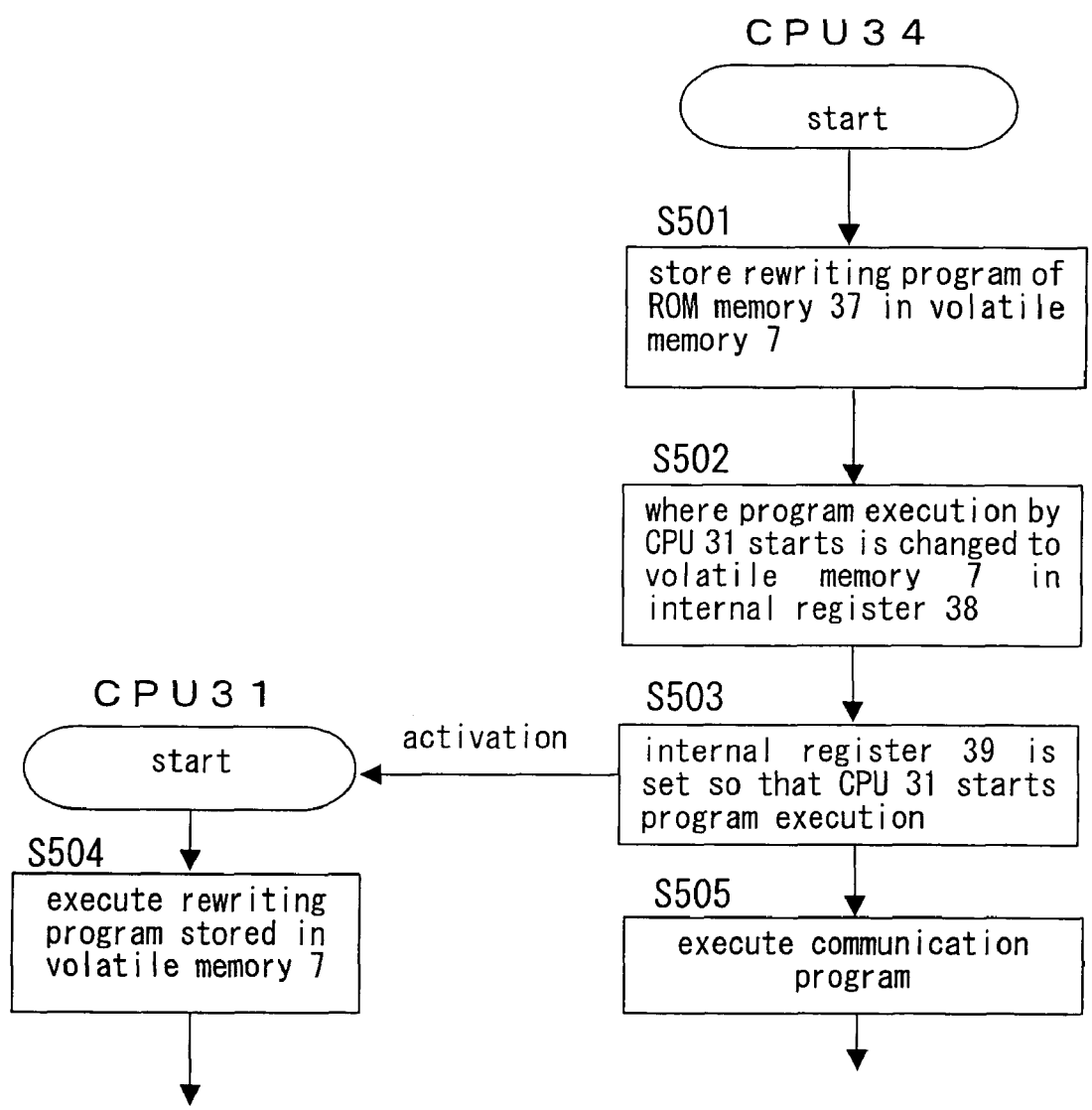
FIG. 5 is a flowchart of a second operation of the writing operation of the optical disk apparatus according to the first preferred embodiment.

The whole program writing operation executes steps shown in a flow chart of FIG. 5.

First, the CPU 34 stores (copies) the rewriting program for the whole program of the non-volatile memory 6 executable by the CPU 31 previously incorporated in the ROM memory 37 in the volatile memory 7 sharable by the CPU 34 and CPU 31 (S501). Further, the CPU 34 sets the volatile memory 7 in the setting of the internal register 38 settable by the program of the CPU 34 for selectively setting if the program execution starts in the non-volatile memory 6 or in the volatile memory 7 when the CPU 31 is reset (when the execution starts) (S502). Further, the CPU 34 sets the internal register 39 in which the execution-start instruction for the CPU 31 can be set by the program of the CPU 34 to thereby start the program execution by the CPU 31 (S503). Further, the CPU 31 executes the rewriting program for the whole program of the non-volatile memory 6 stored in the volatile memory 7 (S504).

When the communication program of the CPU 34 is utilized in the rewriting program (S505), the method for transmitting the whole program from the host computer H to the information processing apparatus through the parallel data communication and easily writing the whole program in the non-volatile memory 6, or the like, is adopted in the 1-CPU system already invented, so that the whole program of the non-volatile memory 6 can be rewritten.

The CPUs 31 and 34 are Simultaneously Activated

Referring to the respective components in comparison to claims 6-10 and 28-32, the CPU 34 corresponds to a first controller, the ROM memory 37 corresponds to a first ROM memory, the CPU 31 corresponds to a second controller, and the ROM memory 35 corresponds to a second ROM memory.

Figure 6:
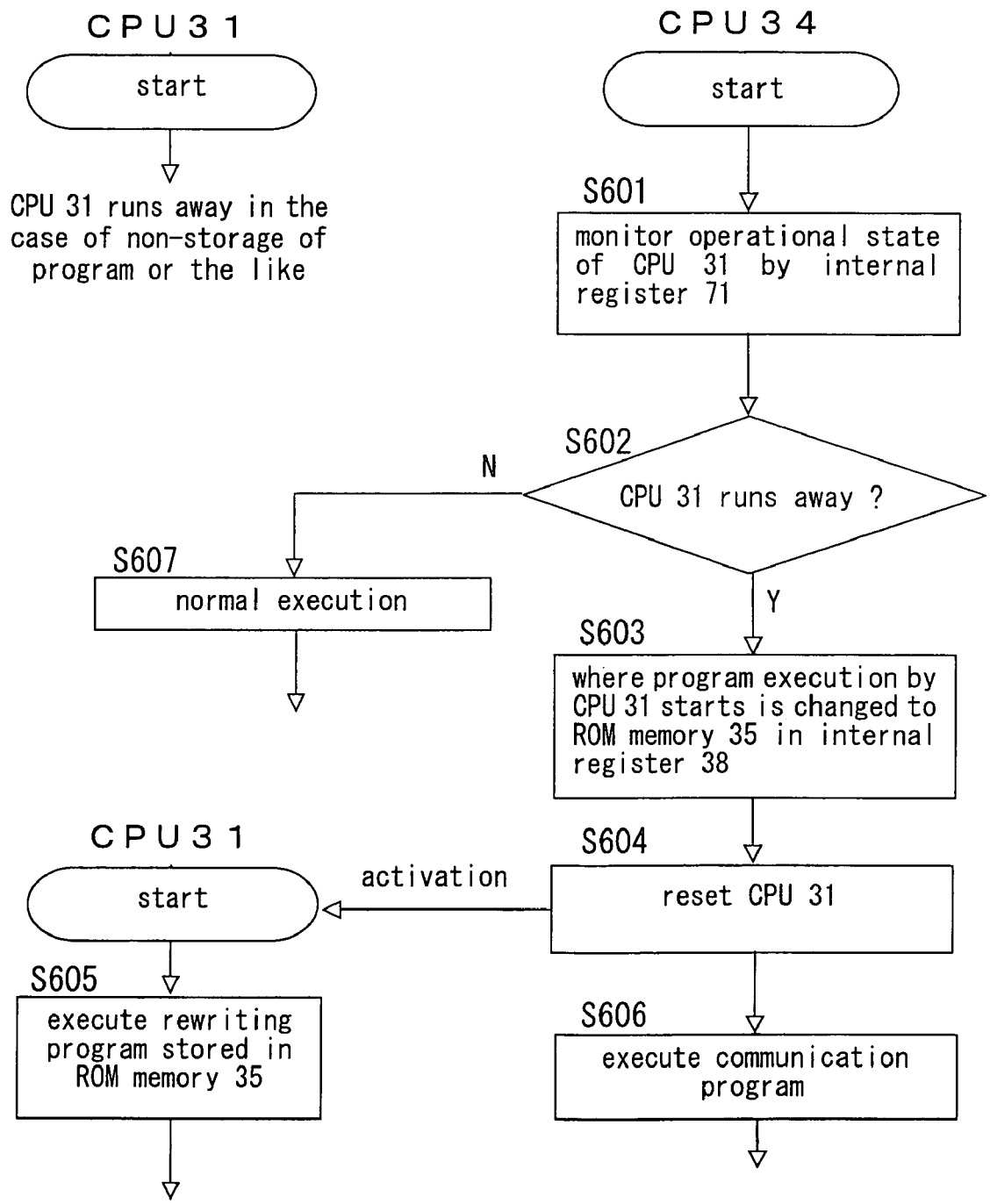
FIG. 6 is a flow chart of a third operation of the writing operation of the optical disk apparatus according to the first preferred embodiment.

The whole program writing operation executes steps shown in a flow chart of FIG. 6.

First, the CPU 34 reads an information indicating the operational state of the CPU 31 set in the volatile memory 7 sharable by the CPU 34 and the CPU 31 to thereby monitor the operational state of the CPU 31 (S601). At the time, the CPU 31 runs away if the program has not been stored. Further, the CPU 34 judges the operational state of the CPU 31 (S602). The CPU 34, upon the judgment that the CPU 31 is in the runaway state, sets the ROM memory 35 in the setting of the internal register 38 settable by the program of the CPU 34 for selectively setting if the program execution starts in the non-volatile memory 6 or in the ROM memory 35 when the CPU 31 is reset (S603). Then, the CPU 34 resets the CPU 31 (S604). The CPU 34 further executes the rewriting program for the whole program of the non-volatile memory 6 stored in the ROM memory 35 (S605). When it is judged that the CPU 31 is not in the runaway state in S602, the normal program execution is selected (S607).

When the communication program of the CPU 34 is utilized in the rewriting program (S606), the method for transmitting the whole program from the host computer H to the information processing apparatus through the parallel data communication and easily writing the whole program in the non-volatile memory 6, or the like, is adopted in the 1-CPU system already invented, so that the whole program of the non-volatile memory 6 can be rewritten.

Figure 7:
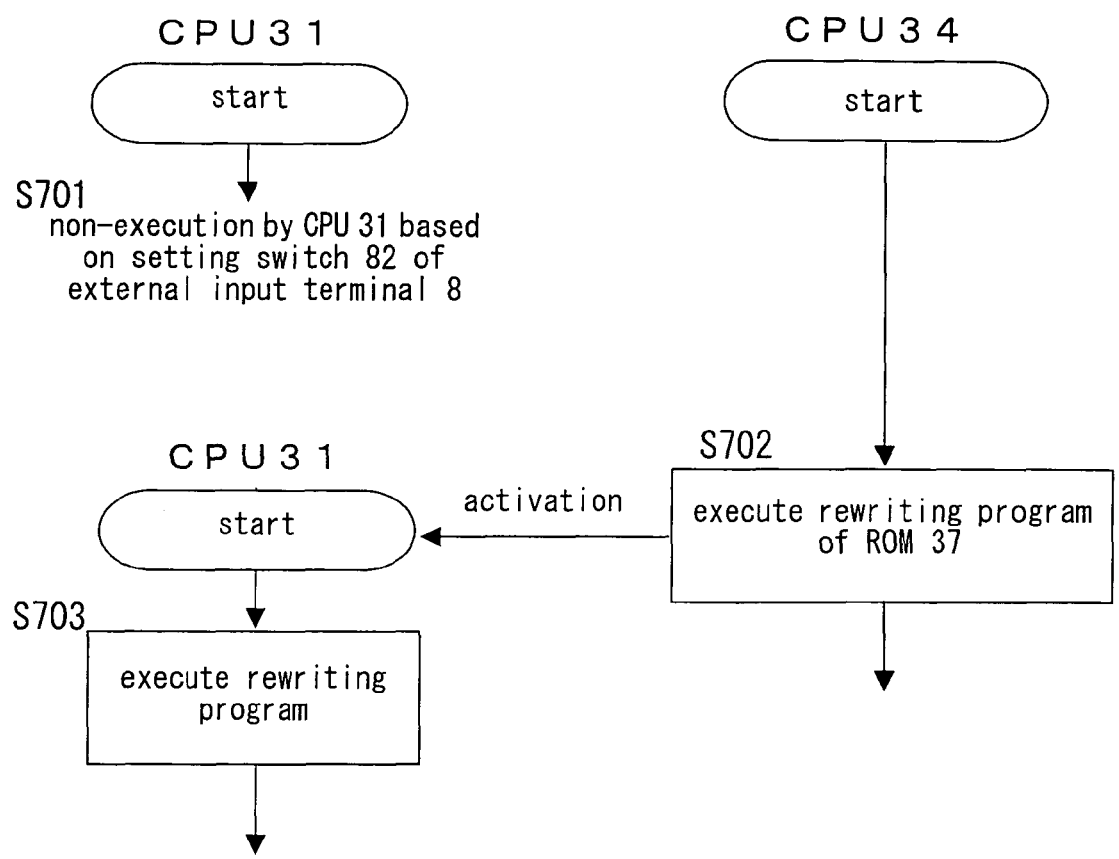
FIG. 7 is a flow chart of a fourth operation of the writing operation of the optical disk apparatus according to the first preferred embodiment.

The whole program writing operation executes steps shown in a flow chart of FIG. 7.

The optical disk controller 3 sets the non-execution of the whole program by the CPU 31 based on the setting of the setting switch 82 of the external input terminal 8 (S701). Then, the rewriting program for the whole program of the non-volatile memory 6 stored in the ROM memory 37 is executed (S702). The CPU 31 further executes the rewriting program for the whole program of the non-volatile memory 6 (S703).

When the method for writing the whole program in the case where the CPU 34 is activated first is adopted in the rewriting program, and the method for transmitting the whole program from the host computer H to the information processing apparatus through the parallel data communication and easily writing the whole program in the non-volatile memory 6, or the like, is adopted in the 1-CPU system already invented, the whole program of the non-volatile memory 6 can be rewritten.

Neither of the Program of the CPU 31 Nor the Program of the CPU 34 is Not Stored or the Operations of the Programs are Incomplete Referring to the respective components in comparison to claims 11-22, 33 and 34, the CPU 34 corresponds to a first controller, the ROM memory 37 corresponds to a first ROM memory, the CPU 31 corresponds to a second controller, the ROM memory 35 corresponds to a second ROM memory, the setting switch 81 of the external input terminal 8 corresponds to a first external input terminal, and the setting switch 82 of the external input terminal 8 corresponds to a second external input terminal.

Figure 8:
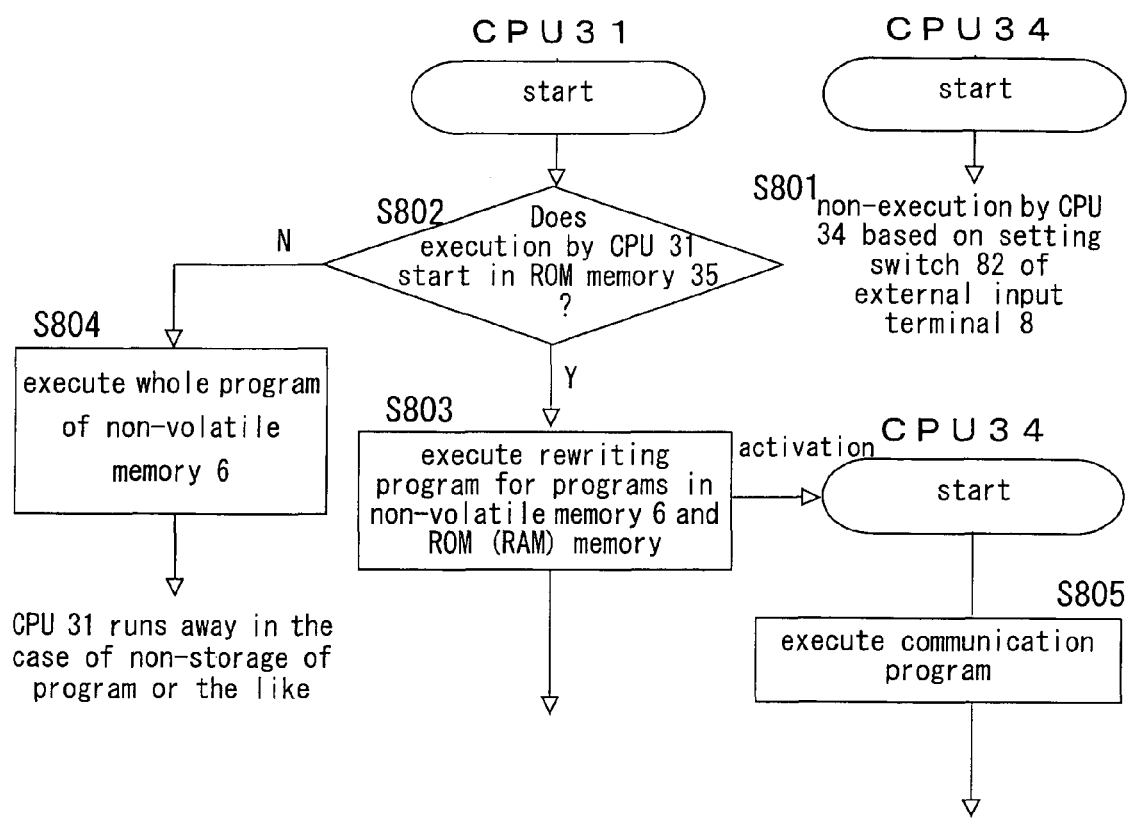
FIG. 8 is a flow chart of a fifth operation of the writing operation of the optical disk apparatus according to the first preferred embodiment.

The whole program writing operation executes steps shown in a flow chart of FIG. 8.

The optical disk controller 3 sets the non-execution of the program by the CPU 34 based on the setting of the setting switch 82 of the external input terminal 8 (S801). The optical disk controller 3 further judges if the program execution by the CPU 31 starts in the non-volatile memory 6 or in the ROM memory 35 based on the setting of the setting switch 81 of the external input terminal 8 (S802). When it is judged that the program execution by the CPU 31 starts in the ROM memory 35, the optical disk controller 3 executes the whole program of the non-volatile memory 6 stored in the ROM memory 35 and the rewriting program of the ROM memory 37 (RAM memory in the development process) (S803). When it is judged that the program execution by the CPU 31 starts in the non-volatile memory 6 in S802, the whole program of the non-volatile memory 6 is executed (S804). The CPU 31 runs away in the case where the program has not been stored.

In the rewriting program, the communication program or the like previously stored in the non-volatile memory 6 or the like is stored in the ROM memory 37 (RAM memory in the development process), and the CPU 34 is activated so that the communication program is utilized (S805). Accordingly, when the method for transmitting the whole program from the host computer H to the information processing apparatus through the parallel data communication and easily writing the whole program in the non-volatile memory 6, or the like, is adopted in the 1-CPU system already invented, the whole program of the non-volatile memory 6 can be rewritten.

Below is described a best mode for implementing the present invention in the case where the rewriting program for the whole program of the non-volatile memory 6 comprises a storage state judging unit for judging a storage state of the non-volatile memory 6, and it is undesirable to store a storage state judging code at a fixed position in terms of a configuration of the whole program of the non-volatile memory 6 referring to FIG. 3.

Figure 3A:
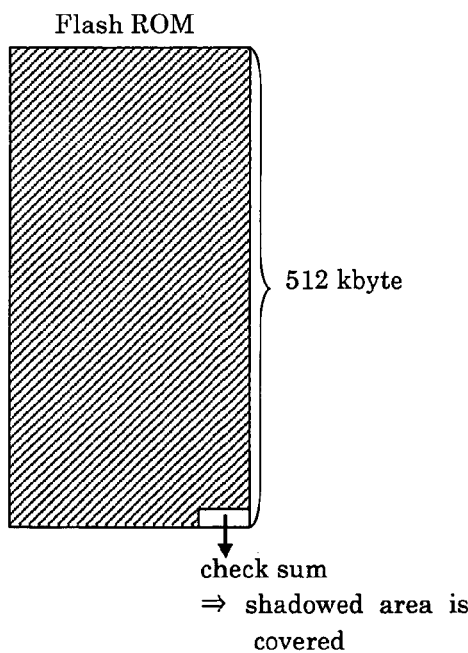
FIGS. 3 are illustrations (images) in the case where a check sum code of F/W has a fixed position and shows a fixed value according to the first preferred embodiment.
Figure 3B:
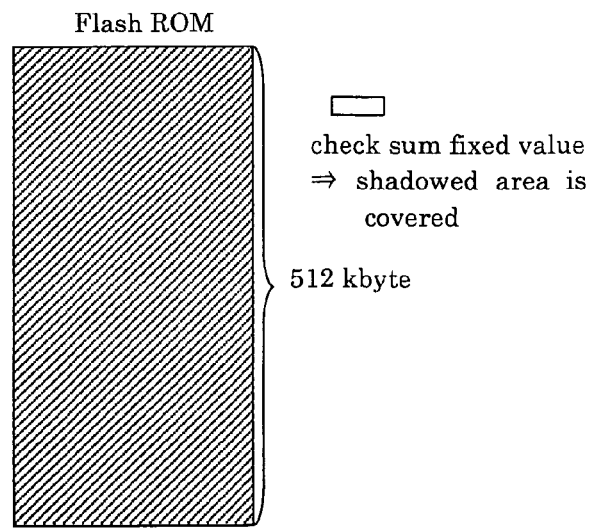

FIG. 3A shows an example where a check sum code of an entire region (excluding the check sum code) of F/W as the whole program of the non-volatile memory 6 is previously stored at a fixed position in a last region of the F/W. FIG. 3B shows an example where the check sum code of the entire region (excluding the check sum code) of the F/W as the whole program of the non-volatile memory 6 is previously stored as a fixed value in the ROM memory 35. In the latter example according to the present invention, the code is embedded in an arbitrary region of the whole program so that a check sum calculation result of the F/W corresponds to the check sum code previously stored in the ROM memory.

The adoption of the foregoing method according to the present invention is equivalent to the embedment of the check sum code in an arbitrary blank region of the F/W in terms of the configuration of the F/W when it is undesirable to place the check sum code at any fixed position in terms of a configuration of the F/W. Therefore, it is unnecessary to reconfigure the F/W in adding any new function to the conventional system. Further, when a size of the non-volatile memory for storing the F/W therein is reduced, or the like, in view of costs and the like, any limitation can be avoided in reconfiguring the F/W (as far as any blank region is available).

It is not necessary to implement the check sum calculation for the entire region of the F/W. A partial region of the F/W previously specified may be an object of the check sum calculation so that a length of time required for the check sum calculation can be reduced to a minimum necessary level, which increases a speed of the control operation.

Second Preferred Embodiment

Figure 9:
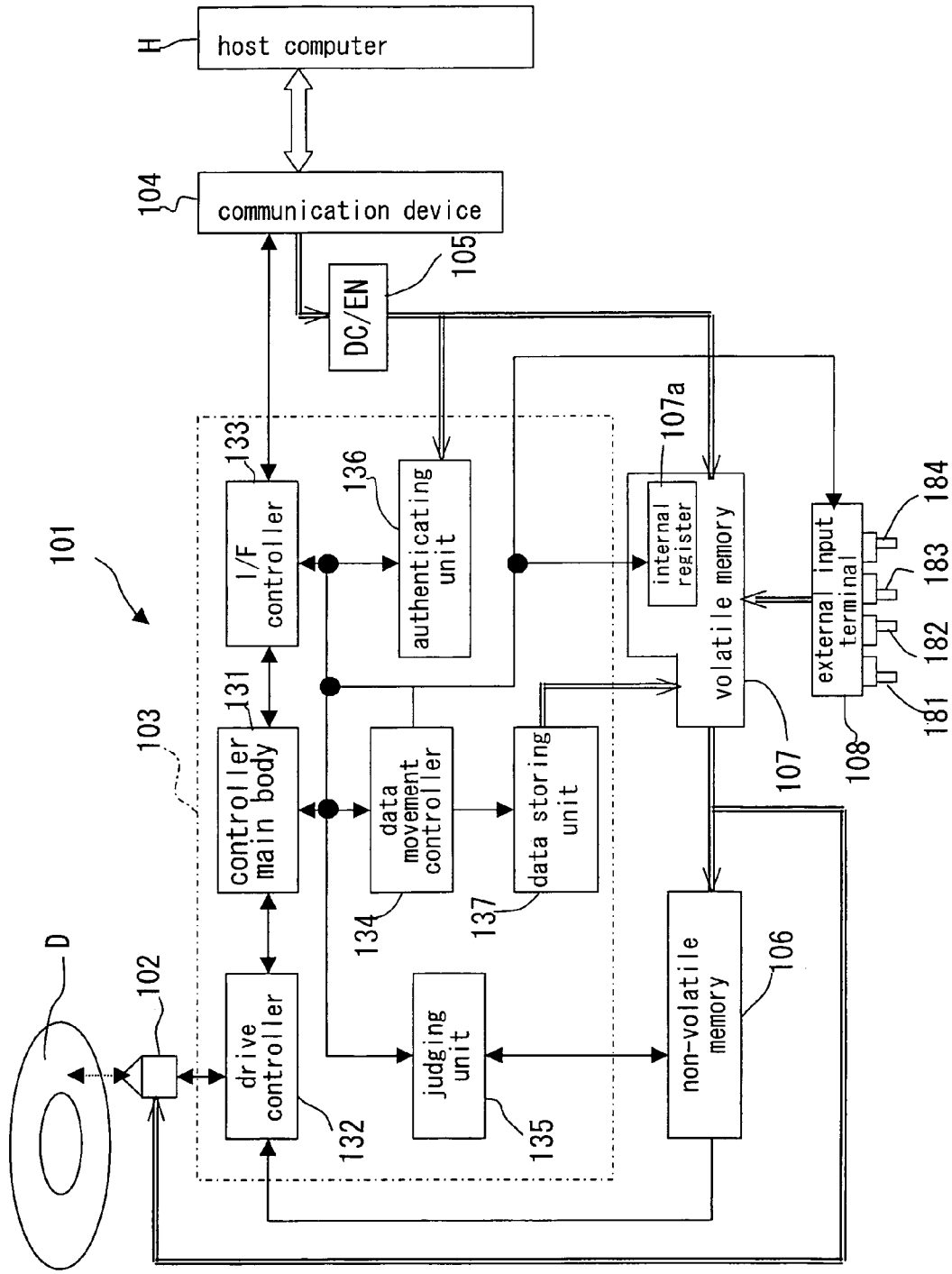
FIG. 9 is a block diagram illustrating a configuration of an optical disk apparatus according to a second preferred embodiment of the present invention.

FIG. 9 is a block diagram illustrating a configuration of an optical disk apparatus according to a second preferred embodiment of the present invention. In FIG. 9, arrows each having a single line shows a flow of a control operation, and arrows each having two lines shows a data flow.

An optical disk apparatus 101 executes such information processings that a communication data received via parallel data communication between the optical disk apparatus and a host computer H is written in an optical disk D, and the data read from the optical disk D is transmitted to the host computer H through the parallel data communication.

The optical disk apparatus 101 comprises an optical disk driving device 102, a controller 103, a communication device 104, a decoding/encoding processor 105 (hereinafter, referred to as DC/EN processor 105), a non-volatile memory 106, a volatile memory 107, and an external input terminal 108. In the optical disk apparatus 101, the controller 103 and the DC/EN processor 105 are configured on software incorporated in the optical disk apparatus 101.

The optical disk driving device 102 reads and writes the data with respect to the optical disk D via an optical pickup (not shown). The communication device 104 executes the parallel data communication between the optical disk apparatus and the host computer H. The optical disk apparatus 101 executes the parallel data communication based on the ATAPI (Attachment Packet Interface) Standard which is a type of the parallel data communication, however, may execute the communication based on other parallel data communication standards.

The DC/EN processor 105 executes the decoding and encoding processings to data transmitted and received between the optical disk apparatus and the host computer H via the communication device 104.

The non-volatile memory 106 comprises a so-called flash ROM, and is a recorder in which a whole program (so-called firmware)of the optical disk apparatus 101 is stored in a non-volatile state (state where the whole program is not extinguished when a power supply is turned off). The whole program includes a driving program for the optical disk driving device 102 and a program equal to a communication program of the communication device 104.

The volatile memory 107 comprises a SDRAM or the like, and is a volatile (extinguished when the power supply is turned off) recorder in which the communication data communicated between the optical disk apparatus and the host computer H via the communication device 104 is temporarily recorded (buffered) The volatile memory 107 buffers the communication data during the normal operations of the optical disk apparatus 101.

The controller 103 is a control device for controlling the whole optical disk apparatus 101 (software in the optical disk apparatus 101), and comprises a controller main body 131, a drive controller 132, an interface controller 133, a data movement controller 134, a judging unit 135, an authenticating unit 136, and a data storing unit 137.

The controller main body 131 commands and controls the whole optical disk apparatus 101. The drive controller 132 drive-controls the optical disk driving device 102 based on an instruction of the controller main body 131. The interface controller 133 controls a communication protocol of the parallel data communication (ATAPI communication) executed by the communication device 104. The judging unit 135 comprises functions as a storage judging unit for judging whether or not data (whole program of the optical disk apparatus 101, and the like) is stored in the non-volatile memory 106 and a state judging unit for judging normality/abnormality of recording contents of the non-volatile memory 106. The authenticating unit 136 authenticates the communication data between the optical disk apparatus 101 and the host computer H based on an authentication command preset with respect to the host computer H. In the data storing unit 137, only the communication program of the communication device 104 provided apart from the whole program of the optical disk apparatus 101 (including the program equal to the communication program of the communication device 104) is stored in the non-volatile state. The communication program is stored in the data storing unit 137 in the form of a program code. The data movement controller 134 controls such an operation that the communication program of the communication device 104 stored in the data storing unit 137 is copied into the volatile memory 107 and executably installed. The data movement controller 134 executes the installing operation when the optical disk apparatus 101 is activated, or the like.

The external input terminal 108 comprises, for example, a plurality of setting switches 181-184. These setting switches 181-184 are hardware or software switches capable of changing a control mode of the controller 103 when the operational personnel of the optical disk apparatus 101 changes combinations of ON/OFF of the switches. The control mode set in the external input terminal 108 is recorded in an internal register 107a provided in a recording region of the volatile memory 107 in a volatile state.

Below is described a data writing operation (writing control method) with respect to the non-volatile memory 106 in the optical disk apparatus 101. In the writing operation of the optical disk apparatus 101, four groups of operational steps, which are a group of internal register updating steps, a group of storage/state judging steps, a group of authenticating steps, and a group of receiving/writing steps, are sequentially executed.

Figure 10:
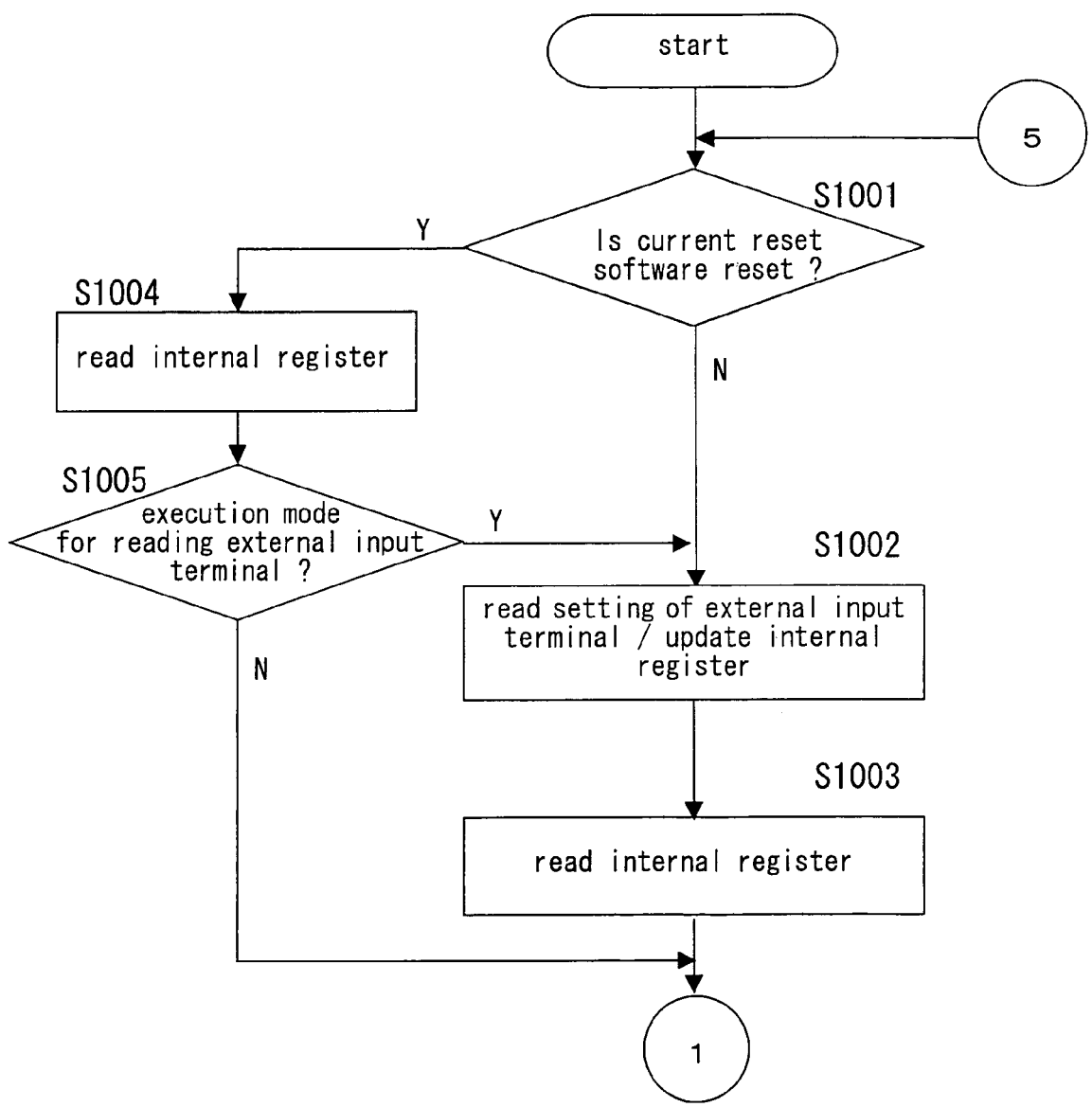
FIG. 10 is a flow chart of a first operation of a writing operation of the optical disk apparatus according to the second preferred embodiment.

The group of internal register updating steps updates recording contents of the internal register 107a. In the internal register 107a, an operational mode of the writing operation is successively updated and recorded. FIG. 10 shows the respective steps of the group of internal register updating steps.

Figure 11:
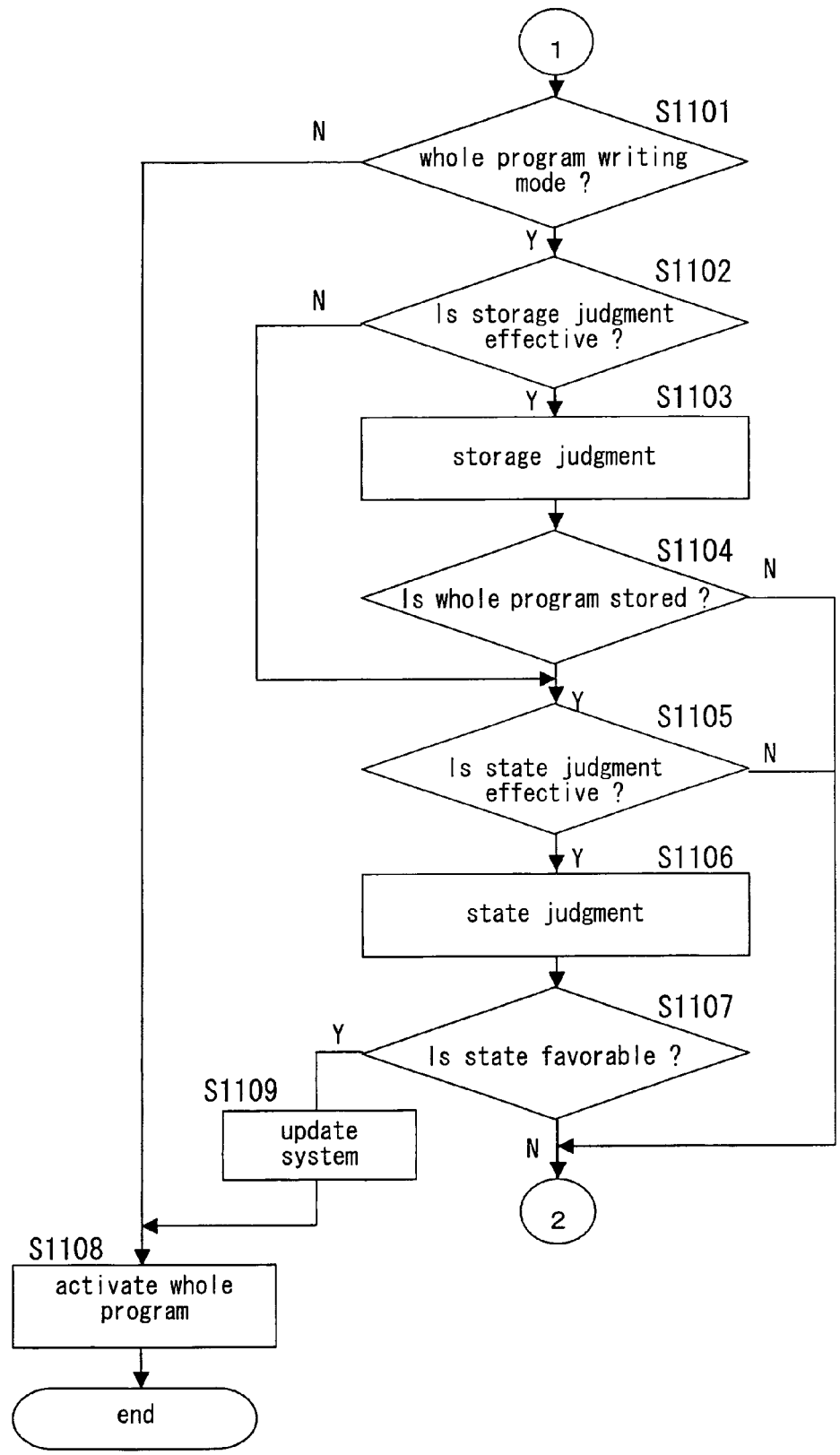
FIG. 11 is a flow chart of a second operation of the writing operation of the optical disk apparatus according to the second preferred embodiment.

The group of storage/state judging steps judges a recording state of the non-volatile memory 106. FIG. 11 shows the respective steps of the group of storage/state judging steps.

Figure 12:
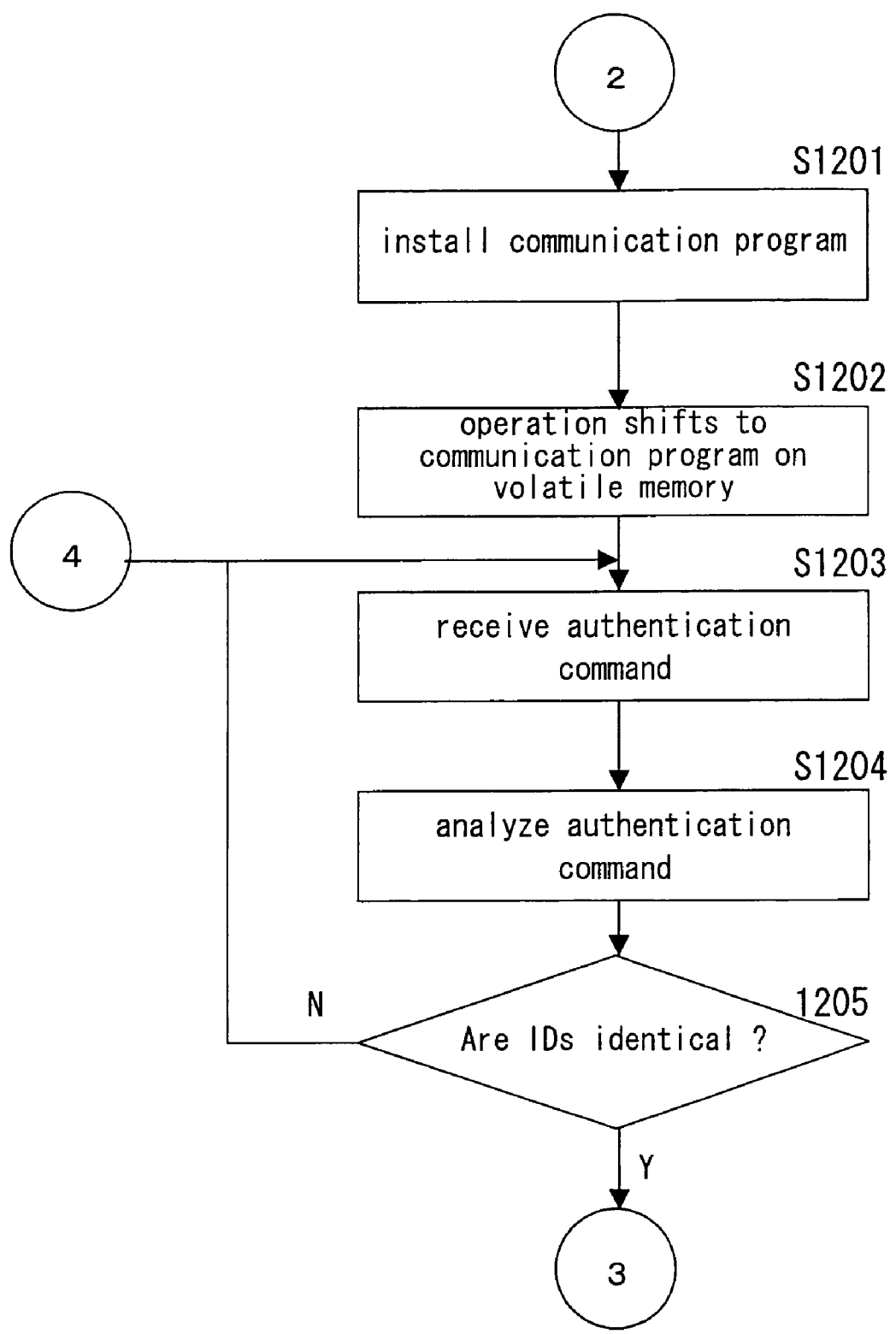
FIG. 12 is a flow chart of a third operation of the writing operation of the optical disk apparatus according to the second preferred embodiment.

The group of authenticating steps authenticates the communication data (writing program and whole program) received from the host computer H when the whole program is downloaded. FIG. 12 shows the respective steps of the group of authenticating steps.

Figure 13:
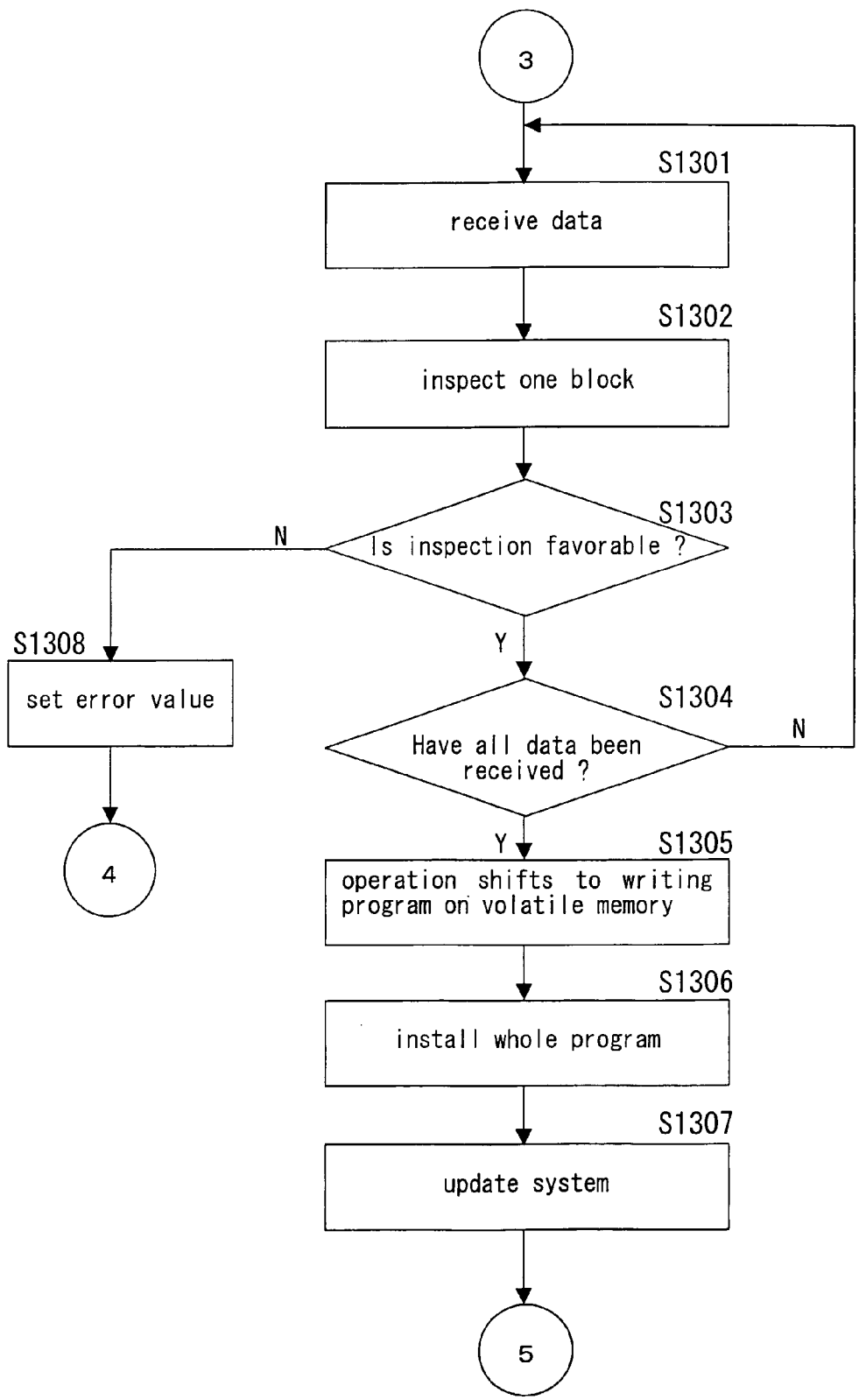
FIG. 13 is a flow chart of a fourth operation of the writing operation of the optical disk apparatus according to the second preferred embodiment.

The group of receiving/writing steps receives (downloads) the communication data (writing program and whole program) received from the host computer H and writes (installs)

the received communication data in the non-volatile memory 106. FIG. 13 shows the respective steps of the group of receiving/writing steps.

Below is described the operation of writing the whole program in the non-volatile memory 106 in the optical disk apparatus 101. The optical disk apparatus 101 cannot operate the whole program so that the whole program is downloaded from the host computer H in the case where the whole program has not been stored in the non-volatile memory 106 or defective though already stored. Therefore, the whole program is downloaded from the host computer H and installed in the non-volatile memory 106 in the following manner.

The whole program writing operation executed by the optical disk apparatus 101 according to the present invention refers to an operation of writing a new whole program in the non-volatile memory 106 in the state where the whole program of the optical disk apparatus 101 has not been stored in the non-volatile memory 106 in the manufacturing process of the optical disk apparatus 101 and an operation of updating the whole program when the optical disk apparatus 101 whose whole program is undergoing any defect is being repaired. Therefore, the writing operation includes an operation of judging whether or not the stored whole program is undergoing any defect and an operation of updating the defective whole program into a normal whole program.

In the optical disk apparatus 1, the whole program writing operation is executed when the optical disk apparatus 101 is reset. The reset (activation) of the optical disk apparatus 101 includes a reset implemented when a power supply of the optical disk apparatus 101 is turned off (OFF) and the apparatus is reactivated (ON) (hereinafter, referred to as hardware reset) and a reset implemented by the whole program of the non-volatile memory 6 or the host computer H on software with the power supply of the optical disk apparatus 101 remaining ON (hereinafter, referred to as software reset).

Prior to the description of the whole program writing operation, modes set in the external input terminal 108 are described. The external input terminal 108 is provided with the plurality of ON/OFF setting switches 181-184. Describing the respective setting switches 181-184, the setting switch 181 switches to and from a whole program writing mode and an normal operation mode, the setting switch 182 selects execution or non-execution of the storage judgment, the setting switch 183 selects execution or non-execution of the state judgment, and the setting switch 184 selects whether or not the setting of the external input terminal 108 is read in the software reset.

When the whole program is written, the operational personnel of the optical disk apparatus 101 (person in charge of manufacturing in the present case) sets the setting switches 181-184 as follows.

The setting switch 181 is set to the whole program writing mode.

The setting switch 182 is set to the storage judgment execution mode.

The setting switch 183 is set to the state judgment execution mode.

The setting switch 184 is set to the external input terminal setting non-reading mode at the time of the software reset. A reason why the setting switch 184 is thus set will be described later.

After the external input terminal 180 is thus set, the whole program is written. The start of the writing operation is triggered by the reset of the optical disk apparatus 101 in terms of the control operation. The whole program writing operation comprises the group of internal register updating steps, group of storage/state judging steps, group of authenticating steps, and group of receiving/writing steps, which are sequentially executed.

The Group of Internal Register Updating Step

In the whole program writing operation, the group of internal register updating steps shown in the flow chart of FIG. 10 is implemented first. More specifically, the optical disk apparatus 101 in which the whole program has not been stored in the non-volatile memory 106 is connected to the host computer H in such a manner that the parallel data communication is allowed. Then, the optical disk apparatus 101 thus connected is reset. The data movement controller 134 judges if the resetting operation is the software reset or the hardware reset (S1001). The start of the internal register updating operation is triggered by the reset of the optical disk apparatus 101 in either of the resetting operations (hardware reset/software reset).

First, the operation in the hardware reset is described. The data movement controller 134 reads the setting details of the external input terminal 108 upon the confirmation of the 30 hardware reset in S1001 and records the read setting details in the internal register 107*a* (S1002). Then, the data movement controller 134 reads the contents of the internal register 107*a* (S1003), and then shifts to the group of storage/state judging steps in the state.

Next, the operation in the software reset is described. The data movement controller 134 reads the recording contents of the internal register 107*a* provided in the volatile memory 107 upon the confirmation of the software reset in S1001 (S1004). Further, the data movement controller 134 judges how the reading mode of the external input terminal 108 in the software reset is set in the read recording contents of the internal register 107*a* (S1005).

In the internal register updating operation, the non-execution mode is set for whether or not the setting of the external input terminal is read in the software reset as described earlier. The data movement controller 134 detects the non-execution mode in S1005 and does not read the setting of the external input terminal 108, and then shifts to the group of storage/state judging steps in the state.

In the case where the execution mode is set for whether or not the setting of the external input terminal is read in the software reset, the data movement controller 134 detects the execution in S1005, and reads the setting of the external input terminal 108 and records the read setting in the internal register 107*a* in the software reset (S1002). The data movement controller 134 further reads the contents of the internal register 107*a* (S1003), and shifts to the group of storage/state judging steps in the state. A reason for providing the two options, which are the execution and the non-execution, for whether or not the setting of the external input terminal 108 is read in the software reset will be described later.

The Group of Storage/State Judging Steps

The data movement controller 134, which read the recording contents of the internal register 107*a* in S1003, implements the group of storage/state judging steps shown in the flow chart of FIG. 11. First, the data movement controller 134 judges whether or not the whole program writing mode is set in the read recording contents of the internal register 107*a* (S1101). When it is judged that the whole program writing mode is not set but the normal operation mode is set, the data movement controller 134 notifies the controller main body 131 of the set mode. The controller main body 131, in response to the notice of the normal operation mode, executes the normal operations of the optical disk apparatus 101 (normal data communication data by the communication device 104 and the operation of writing/reading the communication data with respect to the optical disk D by the optical disk driving device 102) (S1108).

In the manufacturing process, the normal operations are executed, for example, in an inspection of the operation of the optical disk apparatus 101 which is currently in the manufacturing process or in a finished state. The normal operations are also executed by an end user after the manufacturing process of the optical disk apparatus 101 is completed. The normal operation mode is set to allow the foregoing normal operations.

In the whole program writing operation, the setting switch 181 (internal register 107a) is set to, not the normal operation mode, but the whole program writing mode. The data movement controller 134 detects the set mode, and judges whether or not the execution mode of the storage judgment is set in the recording contents of the internal register 107a read in S1003. (S1102).

In the second preferred embodiment, the execution mode of the storage judgment is set in the whole program writing operation as described above. The data movement controller 134 detects the set mode in S1102, and makes the judging unit 135 judge whether or not the whole program is stored in the non-volatile memory 106 (S1103 and S1104). S1103 and S1104 constitute the storage judging steps of the data writing method.

Whether or not the whole program is stored is judged, for example, as follows. The data movement controller 134 records a specific value in a predetermined region of the non-volatile memory 106 when the whole program is written in the non-volatile memory 106. The judging unit 135 checks whether or not the specific value is recoded in the predetermined region of the non-volatile memory 106 when the storage state of the whole program is judged to thereby judge whether or not the whole program is stored.

In an initial state where the whole program has not been stored in the non-volatile memory 106, the judging unit 135 judges that the whole program has not been stored in S1104. The judging unit 135 having judged that the whole program is not stored in S1104 notifies the data movement controller 134 of the non-storage of the whole program. The data movement controller 134 notified of the non-storage of the whole program skips S1106 and S1107 (state judging steps) and shifts to the group of authenticating steps.

The Group of Authenticating Steps

The data movement controller 14, which detected that the whole program was not stored in S1104, implements the group of authenticating steps shown in the flow chart of FIG. 12. First, the data movement controller 134 reads a program data of the communication program stored in the data storing unit 137 in the non-volatile state and copies the read program data into the volatile memory 107 to executably install it (S1201). Further, the data movement controller 134 selects the communication program on the volatile memory 107 as an operational subject in the optical disk apparatus 101 to thereby execute the communication program (S1202). Thereby, the parallel data communication between the communication device 104 and the host computer H is established. S1201 and S1202 constitute a first step of the data writing method.

The parallel data communication by the communication device 104 is controlled by the controller main body 131 and the data movement controller 134 via the interface controller 133. The parallel data communication is mainly controlled by the data movement controller 134 when the whole program is written.

When the parallel data communication between the communication device 104 and the host computer H is established, the host computer H first transmits an authentication command to the communication device 104. The communication device 104 receives the authentication command, and notifies the data movement controller 134 of the reception of the command (S1203).

The data movement controller 134 confirms the reception of the authentication command, and transfers the received authentication command from the communication device 104 to the DC/EN processor 105 to thereby decode the command therein. Further, the data movement controller 134 transfers the decoded authentication command to the authenticating unit 136. The authenticating unit 136, which previously memorizes the authentication command of the host computer H, analyzes the received authentication command to thereby judge whether or not the analyzed command corresponds to the read authentication command of the host computer H. The authenticating unit 136 notifies the data movement controller 134 of a result of the judgment (S1204 and S1205). Whether or not the authentication commands correspond to each other is judged, for example, by collating their ID data with each other.

When the received authentication command is authenticated in S1205, the data movement controller 134 shifts the operation to the group of receiving/writing steps. When the received authentication command fails to be authenticated, the data movement controller 134 returns to S1203 to continue to receive the authentication command. The group of authenticating steps is continued until the authentication of the received authentication command is completed (IDs match with each other).

The implementation of the group of authenticating steps can forestall such an inconvenience that a defective whole program or unexpected data is received from a false host computer H and written in the non-volatile memory 106. S1203-S1205 constitute the authenticating steps of the data writing method.

The Group of Receiving/Writing Steps

When it is confirmed in S1205 that the authentication of the received authentication command is completed, the data movement controller 134 continuously executes the communication program on the volatile memory 107 to thereby receive the data of the writing program (so-called loader) and the whole program (so-called firmware) from the host computer H. The whole program is a program for driving the optical disk apparatus 101. The writing program is a program for writing (installing) the whole program from the volatile memory 107 into the non-volatile memory 106.

The data is continuously received in the communication device 104 (S1301). At the time, the communication program inspects the received data (whole program and writing program) per a certain data block (S1302 and S1303), and continuously receives data blocks that follow only when a result of the inspection is judged to be favorable in S1303. When the inspection result is judged to be unfavorable in S1303, the communication program sets an error value and memorizes the error value in the volatile memory 107 (S1308), and returns to the reception of the authentication data in S1203 to continue the processing. The implementation of the steps S1302, S1303 and S1308 improves the reliability of the received data.

The communication program, while continuously executing the data reception in S1301-S1303 and S1308, monitors whether or not all of the data of the whole program and the writing program are received (S1304). When it is confirmed that the reception of all of the data is completed, the communication program notifies the data movement controller 134 of the completion. S1301-S1304 constitute a second step of the data writing method.

The data movement controller 134 notified of the completion of the reception installs the writing program on the volatile memory 107 so that the writing program is executable on the volatile memory 107. Further, the data movement controller 134 shifts the current operational subject from the communication program on the volatile memory 107 to the writing program on the volatile memory 107 (S1305). The writing program on the volatile memory 107 as the operational subject writes the data of the whole program downloaded into the volatile memory 107 in the non-volatile memory 106, and installs the written whole program so that it is executable on the non-volatile memory 106 (S1306). S1305 and S1306 constitute a third step of the data writing method.

When the whole program is completely written, the writing program notifies the data movement controller 134 of the completion. The data movement controller 134 notified of the completion of the writing operation software-resets the system of the optical disk apparatus 101 while retaining the setting of the internal register 107a, and returns to the group of internal register updating steps to continue the processing (S1307).

The group of internal register updating steps After the system is updated (software-reset) in S1307, the data movement controller 134 confirms the implemented resetting operation (S1001). In the present case, the data movement controller 134 naturally detects the software reset.

The data movement controller 134, upon the confirmation of the software reset in S1001, reads the recording contents of the internal register 107a provided in the volatile memory 107 (S1004). Further, the data movement controller 134 judges how the reading mode of the external input terminal 108 in the software reset is set in the read recording contents of the internal register 107a (S1005).

At this point, the non-execution mode is continuously set for whether or not the setting of the external input terminal is read in the software reset in the system updating step (S1307) as described earlier. Therefore, the data movement controller 134 detects the non-execution mode and does not read the setting of the external input terminal 108, and then shifts to the group of storage/state judging steps in the state.

The Group of Storage/State Judging Steps

The data movement controller 134, which detected that the non-execution mode was continuously set for whether or not the setting of the external input terminal is read in the internal register 107a, judges again whether or not the whole program writing mode is set in the read recording contents of the internal register 107a (S1101). At this point, the data movement controller 134 naturally judges that the whole program writing mode is set instead of the normal operation mode. Then, the data movement controller 134 judge whether or not the execution mode for the storage judgment is set in the recording contents of the internal register 107a read in S1003 (S1102).

In the second preferred embodiment, the execution mode is set for the storage judgment in the whole program writing operation as described earlier, and the execution mode is maintained after the system updating step S1307. The data movement controller 134 detects the execution mode in S1105, and makes the judging unit 135 judge whether or not the whole program is stored in the non-volatile memory 106 (S1103 and S1104).

At this point, the judging unit 135 judges that the whole program is stored in the non-volatile memory 106. The judging unit 135, which judged that the whole program was stored in S1104, notifies the data movement controller 134 of the storage of the whole program. The data movement controller 134 notified of the storage of the whole program judges whether or not the execution mode of the stage judgment is set in the read recording contents of the internal register 107a (S1105).

In the second preferred embodiment, as described earlier, the execution mode of the state judgment is set in the whole program writing operation. The data movement controller 1134 detects the execution mode in S1105 and makes the judging unit 135 judge whether or not the whole program stored in the non-volatile memory 106 is defective (S1106 and S1107). S1106 and S1107 constitute the state judging steps of the data writing method.

For example, the state of the whole program is judged as follows. More specifically, the data movement controller 134 sets a check sum region in each data section to be written when the whole program is written in the non-volatile memory 106. At the time of judging the state of the whole program, the judging unit 135 inspects the check sum set in the predetermined region of the non-volatile memory 106 when the whole program is written to thereby judge the state of the whole program.

When the whole program is written in the non-volatile memory 106, the check sum region may be set in the data section already written in the non-volatile memory 106. Thereby, the state of the whole program is judged by the judging unit 135 with respect to the region actually recorded on the non-volatile memory 106 in which the check sum region is set, which reduces a processing time.

Of the data regions of the whole program written in the non-volatile memory 106, there are regions such as a power adjustment table and a constant management region where it is necessary to judge installation states thereof, and regions such as an unnecessary region subjected to a padding processing and a dynamic variable region where the judgment of the states is unnecessary. Therefore, the check sum may be set only in the region where the data requiring the state judgment is stored. In doing so, the processing time can still be reduced because the state of the whole program is judged by the judging unit 135 with respect to the recording region on the non-volatile memory 106 where the check sum region is set for which the inspection is indispensable.

When the whole program is updated a plurality of times because the defective state is continuously generated therein, the check sum in the region to be updated whose state is judged to be favorable by the judging unit 135 may be eliminated so that the check sum is set only in the recording region whose state is judged to be unfavorable. Then, only the defective part can be subjected to the state judgment, which reduces the processing time.

When the judging unit 135 judges that the state of the whole program installed in the non-volatile memory 106 is still defective in S1107, the group of authenticating steps shown in FIG. 12 and the group of receiving/writing steps shown in FIG. 13 are implemented so that the whole program on the non-volatile memory 106 is updated again.

When the judging unit 135 judges that the state of the installed whole program is good in S1107 after the whole program writing operation is executed once or a plurality of times (see FIGS. 10-13), the judging unit 135 notifies the data movement controller 134 of the judgment. The data movement controller 134 notified of the installation of the whole program in the non-volatile memory 106 in good condition changes a part of the setting of the internal register 107a (S1109), and software-resets the system of the optical disk apparatus 101 so that the whole program is activated (S1108). Thus, all of the steps of the whole program writing operation are completed.

The setting of the internal register 107*a* is corrected by the data movement controller 134 as follows. At this point, the whole program writing operation has been completed, and the whole program writing mode set in the setting switch 181 is switched to the normal operation mode. Thereby, the optical disk apparatus 101 is software-reset in S1108 instead of the hardware reset in which the power supply of the optical disk apparatus 101 is turned off. Then, other steps (inspecting step and the like) to be implemented after the whole program is installed can be implemented. Further, the implementation of the processings unnecessary for the other steps, such as the storage judgment and the state judgment of the whole program, can be prevented, which reduces the processing time. Further, because the internal register 107*a* can be automatically rewritten on software, the operational personnel can omit such an extra processing as rewriting the setting of the external input terminal 108.

In the case where the storage judgment (S1103) and/or the state judgment (S1106) of the whole program in the non-volatile memory 106 are necessary in the other steps, the setting of the internal register 107*a* may be maintained in an initial state in the system updating processing in S1109.

In order to execute the system updating processing (including the change of the setting of the internal register 107*a*) in S1109, which was described earlier, it is necessary not to read the setting of the external input terminal 108 in the software reset. When the setting of the external input terminal 108 is read in the software reset, the system updating processing (including the change of the setting of the internal register 107*a*) in S1109 becomes ineffective. Therefore, in the optical disk apparatus 101, the setting switch 184 which controls the reading of the external input terminal setting in the software reset is provided in the external input terminal 108 as a component for switching to and from effective and ineffective of the system updating processing in S1109. The setting of the setting switch 184 is changed, and effective/ineffective of the system updating processing in S1109 is controlled in the judgment processing in S1005.

The foregoing description referring to FIGS. 10-13 described the processing when the whole program is newly installed in the non-volatile memory 106 of the optical disk apparatus 101. It is needless to say that the processing can be executed in the same manner when the optical disk apparatus 101 whose whole program is undergoing any software-wise defect is repaired.

In the second preferred embodiment, the present invention was applied to the optical disk apparatus. The present invention can also be applied to any configuration wherein information processings are executed to communication data transmitted and received with respect to a host computer and a whole program is stored in a non-volatile memory in the same manner.

In the second preferred embodiment, the external input terminal 108 is initially set in such a manner that the storage judgment and the state judgment are both made in the whole program writing operation, however, the non-execution may be selected for these judgment processings if necessary when the external input terminal 108 is initially set. Then, the omission of these processings results in the reduction of the processing time.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. An information processing apparatus for processing communication data obtained through data communication between the information processing apparatus and a host computer comprising:

a communication device for executing the data communication between the information processing apparatus and the host computer;

a volatile memory provided for storing the communication data therein;

a first controller (CPU) for controlling communication processings of the communication device and information processings to be executed to the communication data stored in the volatile memory;

a first ROM memory in which a program of the first controller is previously stored;

a second controller (CPU) for controlling the whole apparatus;

a non-volatile memory provided for storing a whole program of the second controller therein;

a second ROM memory in which another program executable by the second controller is previously stored; and an external input terminal adapted in such a manner that an operational personnel can selectively set if program execution by the second controller starts in the non-volatile memory or in the second ROM memory, wherein where the program execution starts is selected in accordance with the setting of the external input terminal when the information processing apparatus is activated.

2. The information processing apparatus as claimed in claim 1, wherein the second controller first starts the program execution while the first controller remains halted when the information processing apparatus is activated.

3. The information processing apparatus as claimed in claim 1, wherein a rewriting program for the whole program of the non-volatile memory is stored in the second ROM memory.

4. An information processing apparatus for executing processing communication data obtained through data communication between the information processing apparatus and a host computer comprising:

a communication device for executing the data communication between the information processing apparatus and the host computer;

a volatile memory provided for storing the communication data therein;

a first controller (CPU) for controlling communication processings of the communication device and information processings to be executed to the communication data stored in the volatile memory;

a ROM memory in which a program of the first controller is previously stored;

a second controller (CPU) for controlling the whole apparatus;

a non-volatile memory provided for storing a whole program of the second controller therein;

a first register in which if program execution starts in the non-volatile memory or in the volatile memory can be selectively set by the program of the first controller when the second controller is reset (when the execution starts); and a second register in which an execution-start instruction for the second controller can be set by the program of the first controller, wherein a program executable by the second controller is previously installed in the ROM memory, the program executable by the second controller is stored (copied) in the volatile memory sharable by the first and second controllers, and the first controller switches from the setting by the first register to the setting by the second register so that the second controller starts the program execution.

5. The information processing apparatus as claimed in claim 4, wherein a rewriting program for the whole program of the non-volatile memory is stored in the volatile memory sharable by the first and second controllers and executed.

6. An information processing apparatus for processing communication data obtained through data communication between the information processing apparatus and a host computer comprising:

a communication device for executing the data communication between the information processing apparatus and the host computer;

a volatile memory provided for storing the communication data therein;

a first controller (CPU) for controlling communication processings of the communication device and information processings to be executed to the communication data stored in the volatile memory;

a first ROM memory in which a program of the first controller is previously stored;

a second controller (CPU) for controlling the whole apparatus;

a non-volatile memory provided for storing a whole program of the second controller therein;

a second ROM memory in which another program executable by the second controller is previously stored; and a register in which if program execution starts in the non-volatile memory or in the second ROM memory can be selectively set by the program of the first controller when the second controller is reset, wherein an information indicating an operational state of the second controller is set in the volatile memory sharable by the first and second controllers, the first controller reads the information indicating the operational state of the second controller so that the operational state of the second controller can be monitored, and the first controller changes the setting of the register in accordance with the operational state of the second controller to thereby reset the second controller, so that where the program execution by the second controller starts is changed.

7. The information processing apparatus as claimed in claim 6, wherein a rewriting program for the whole program of the non-volatile memory is stored in the second ROM memory.

8. An information processing apparatus for processing communication data obtained through data communication between the information processing apparatus and a host computer comprising:

a communication device for executing the data communication between the information processing apparatus and the host computer;

a volatile memory provided for storing the communication data therein;

a first controller (CPU) for controlling communication processings of the communication device and information processings to be executed to the communication data stored in the volatile memory;

a ROM memory in which a program of the first controller is previously stored;

a second controller (CPU) for controlling the whole apparatus;

a non-volatile memory provided for storing a whole program of the second controller therein, and an external input terminal adapted in such a manner that an operational personnel can set whether or not execution of the whole program of the second controller starts, wherein whether or not the execution of the whole program of the second controller starts is set in accordance with the setting of the external input terminal when the information processing apparatus is activated.

9. The information processing apparatus as claimed in claim 8, wherein the first controller and the second controller simultaneously start the program execution, and an operational state of the second controller affects an operation of the first controller when the information processing apparatus is activated.

10. The information processing apparatus as claimed in claim 8, wherein the first controller executes a rewriting program for the whole program of the non-volatile memory.

11. An information processing apparatus for processing communication data obtained through data communication between the information processing apparatus and a host computer comprising:

a communication device for executing the data communication between the information processing apparatus and the host computer;

a volatile memory provided for storing the communication data therein;

a first controller (CPU) for controlling communication processings of the communication device and information processings to be executed to the communication data stored in the volatile memory;

a first ROM memory in which a program of the first controller is previously stored;

a second controller (CPU) for controlling the whole apparatus;

a non-volatile memory provided for storing a whole program of the second controller therein;

a second ROM memory in which another program executable by the first controller or the second controller is previously stored;

a first external input terminal adapted in such a manner that an operational personnel can selectively set if program execution by the first controller or the second controller starts in the first ROM memory or in the second ROM memory, or in the non-volatile memory or in the second ROM memory; and a second external input terminal adapted in such a manner that the operational personnel can set whether or not the program execution by the first controller or the second controller starts, wherein where the program execution starts is selected in accordance with the setting of the first external input terminal when the information processing apparatus is activated, and whether or not the program execution starts is selected in accordance with the setting of the second external input terminal when the information processing apparatus is activated.

12. The information processing apparatus as claimed in claim 11, wherein a rewriting program for the whole program of the non-volatile memory is stored in the second ROM memory.

13. The information processing apparatus as claimed in claim 3, wherein
the rewriting program for the whole program stored in the non-volatile memory comprises a storage state judging unit for judging a storage state of the non-volatile memory, and
the storage state judging unit makes a judgment by comparing a fixed code (or fixed value) previously memorized as ROM in the storage state judging unit to a code generated by means of a calculating formula preset with respect to the whole program stored in the non-volatile memory.

14. The information processing apparatus as claimed in claim 13, wherein the storage state judging unit judges only a partial region of the non-volatile memory previously specified.

15. The information processing apparatus as claimed in claim 5, wherein
the rewriting program for the whole program stored in the non-volatile memory comprises a storage state judging unit for judging a storage state of the non-volatile memory, and
the storage state judging unit makes a judgment by comparing a fixed code (or fixed value) previously memorized as ROM in the storage state judging unit to a code generated by means of a calculating formula preset with respect to the whole program stored in the non-volatile memory.

16. The information processing apparatus as claimed in claim 15, wherein the storage state judging unit judges only a partial region of the non-volatile memory previously specified.

17. The information processing apparatus as claimed in claim 7, wherein
the rewriting program for the whole program stored in the non-volatile memory comprises a storage state judging unit for judging a storage state of the non-volatile memory, and
the storage state judging unit makes a judgment by comparing a fixed code (or fixed value) previously memorized as ROM in the storage state judging unit to a code generated by means of a calculating formula preset with respect to the whole program stored in the non-volatile memory.

18. The information processing apparatus as claimed in claim 17, wherein the storage state judging unit judges only a partial region of the non-volatile memory previously specified.

19. The information processing apparatus as claimed in claim 10, wherein
the rewriting program for the whole program stored in the non-volatile memory comprises a storage state judging unit for judging a storage state of the non-volatile memory, and
the storage state judging unit makes a judgment by comparing a fixed code (or fixed value) previously memorized as ROM in the storage state judging unit to a code generated by means of a calculating formula preset with respect to the whole program stored in the non-volatile memory.

20. The information processing apparatus as claimed in claim 19, wherein the storage state judging unit judges only a partial region of the non-volatile memory previously specified.

21. The information processing apparatus as claimed in claim 12, wherein
the rewriting program for the whole program stored in the non-volatile memory comprises a storage state judging unit for judging a storage state of the non-volatile memory, and
the storage state judging unit makes a judgment by comparing a fixed code (or fixed value) previously memorized as ROM in the storage state judging unit to a code generated by means of a calculating formula preset with respect to the whole program stored in the non-volatile memory.

22. The information processing apparatus as claimed in claim 21, wherein the storage state judging unit judges only a partial region of the non-volatile memory previously specified.

23. A data writing method for writing a communication data obtained through data communication between an information processing device and a host computer in a non-volatile memory comprising:
a step for preparing a communication device for executing the data communication between the information processing apparatus and the host computer;
a step for preparing a volatile memory provided for storing the communication data therein;
a step for preparing a first controller (CPU) for controlling communication processings of the communication device and information processings to be executed to the communication data stored in the volatile memory;
a step for preparing a first ROM memory in which a program of the first controller is previously stored;
a step for preparing a second controller (CPU) for controlling the whole apparatus;
a step for preparing the non-volatile memory provided for storing a whole program of the second controller therein;
a step for preparing a second ROM memory in which another program executable by the second controller is previously stored;
a step for preparing an external input terminal adapted in such a manner that an operational personnel can selectively set if program execution by the second controller starts in the non-volatile memory or in the second ROM memory;
a first step for judging if the program execution by the second controller starts in the non-volatile memory or in the second ROM memory depending on the setting of the external input terminal; and
a second step for judging that the program execution by the second controller starts in the second ROM memory and executing the another executable program stored in the second ROM memory different to the program of the non-volatile memory.

24. The data writing method as claimed in claim 23, wherein
the second controller first starts the program execution while the first controller remains halted when the information processing apparatus is activated.

25. The data writing method as claimed in claim 23, wherein a rewriting program for the whole program is executed in the second step.

26. A data writing method for writing a communication data obtained through data communication between an information processing device and a host computer in a non-volatile memory comprising:
- a step for preparing a communication device for executing the data communication between the information processing apparatus and the host computer;
- a step for preparing a volatile memory provided for storing the communication data therein;
- a step for preparing a first controller (CPU) for controlling communication processings of the communication device and information processings to be executed to the communication data stored in the volatile memory;
- a step for preparing a ROM memory in which a program of the first controller is previously stored;
- a step for preparing a second controller (CPU) for controlling the whole apparatus;
- a step for preparing the non-volatile memory provided for storing a whole program of the second controller therein;
- a step for preparing a first register in which if program execution starts in the non-volatile memory or in the volatile memory when the second controller is reset (when the execution starts) can be selectively set by the program of the first controller;
- a step for preparing a second register in which an execution-start instruction for the second controller can be set by the program of the first controller;
- a first step in which the first controller stores (copies) the program executable by the second controller previously installed in the first ROM memory in the volatile memory sharable by the first and second controllers;
- a second step in which the first controller sets the volatile memory in the setting of the first register in which if the program execution starts in the non-volatile memory or in the volatile memory when reset (when the execution starts) can be selectively set by the program of the first controller,
- a third step in which the first controller sets the second register in which the execution-start instruction for the second controller can be set by the program of the first controller so that the second controller starts the program execution; and
- a fourth step in which the second controller executes the program stored in the volatile memory.

27. The data writing method as claimed in claim 26, wherein
- a rewriting program for the whole program of the non-volatile memory executable by the second controller is previously installed in the first ROM memory in the first step, and
- the rewriting program for the whole program of the non-volatile memory is executed in the fourth step.

28. A data writing method for writing a communication data obtained through data communication between an information processing device and a host computer in a non-volatile memory comprising:
- a step for preparing a communication device for executing the data communication between the information processing apparatus and the host computer;
- a step for preparing a volatile memory provided for storing the communication data therein;
- a step for preparing a first controller (CPU) for controlling communication processings of the communication device and information processings to be executed to the communication data stored in the volatile memory;
- a step for preparing a first ROM memory in which a program of the first controller is previously stored;
- a step for preparing a second controller (CPU) for controlling the whole apparatus;
- a step for preparing the non-volatile memory provided for storing a whole program of the second controller therein;
- a step for preparing a second ROM memory in which another program executable by the second controller is previously stored;
- a step for preparing a register in which if program execution starts in the non-volatile memory or in the second ROM memory when the second controller is reset can be selectively set by the program of the first controller;
- a first step for monitoring an operational state of the second controller in such a manner that the first controller reads an information indicating the operational state of the second controller set in the volatile memory sharable by the first and second controllers;
- a second step in which the first controller judges the operational state of the second controller;
- a third step in which the first controller sets the second ROM memory in the setting of the register in which if the program execution starts in the non-volatile memory or in the second ROM memory when the second controller is reset can be selectively set by the program of the first controller when the second controller is judged to be in a runaway state;
- a fourth step in which the first controller resets the second controller; and
- a fifth step in which the second controller executes the program stored in the second ROM memory.

29. The data writing method as claimed in claim 28, wherein a rewriting program for the whole program of the non-volatile memory is executed in the fifth step.

30. A data writing method for writing a communication data obtained through data communication between an information processing device and a host computer in a non-volatile memory comprising:
- a step for preparing a communication device for executing the data communication between the information processing apparatus and the host computer;
- a step for preparing a volatile memory provided for storing the communication data therein;
- a step for preparing a first controller (CPU) for controlling communication processings of the communication device and information processings to be executed to the communication data stored in the volatile memory;
- a step for preparing a ROM memory in which a program of the first controller is previously stored;
- a step for preparing a second controller (CPU) for controlling the whole apparatus;
- a step for preparing the non-volatile memory provided for storing a whole program of the second controller therein;
- a step for preparing an external input terminal adapted in such a manner that an operational personnel can set whether or not execution of the whole program of the second controller starts;
- a first step for preventing the execution of the whole program of the second controller based on the setting of the external input terminal; and
- a second step for executing the program stored in the ROM memory.

31. The data writing method as claimed in claim 30, wherein the first controller and the second controller simultaneously start the program execution, and an operational state of the second controller affects an operation of the first controller when the information processing apparatus is activated.

32. The data writing method as claimed in claim 30, wherein a rewriting program for the whole program of the non-volatile memory is executed in the second step.

33. A data writing method for writing a communication data obtained through data communication between an information processing device and a host computer in a non-volatile memory comprising:
   a step for preparing a communication device for executing the data communication between the information processing apparatus and the host computer;
   a step for preparing a volatile memory provided for storing the communication data therein;
   a step for preparing a first controller (CPU) for controlling communication processings of the communication device and information processings to be executed to the communication data stored in the volatile memory;
   a step for preparing a first ROM memory in which a program of the first controller is previously stored;
   a step for preparing a second controller (CPU) for controlling the whole apparatus;
   a step for preparing the non-volatile memory provided for storing a whole program of the second controller therein;
   a step for preparing a second ROM memory in which another program executable by the first controller or the second controller is previously stored;
   a step for preparing a first external input terminal adapted in such a manner that an operational personnel can selectively set if program execution by the first controller or the second controller starts in the first ROM memory or in the second ROM memory, or in the non-volatile memory or in the second ROM memory;
   a step for preparing a second external input terminal adapted in such a manner that the operational personnel can set whether or not the program execution by the first controller or the second controller starts;
   a first step for preventing the program execution by the first controller based on the setting of the second external input terminal;
   a second step for judging if the program execution by the second controller starts in the non-volatile memory or in the second ROM memory based on the setting of the first external input terminal; and
   a third step for executing the program stored in the second ROM memory when it is judged that the program execution by the second controller starts in the second ROM memory.

34. The data writing method as claimed in claim 33, wherein the whole program of the non-volatile memory and a rewriting program in the first ROM memory (RAM memory in the development process) are executed in the third step.

35. An information processing apparatus for processing communication data obtained through data communication between the information processing apparatus and a host computer comprising:
   a communication device for executing the data communication between the information processing apparatus and the host computer;
   a volatile memory provided for storing the communication data therein;
   a controller (CPU) for controlling the whole apparatus including communication processings of the communication device and information processings to be executed to the communication data stored in the volatile memory;
   a non-volatile memory provided for storing a whole program of the controller therein;
   a ROM memory in which another program executable by the controller is previously stored; and
   an external input terminal adapted in such a manner that an operational personnel can selectively set whether or not program execution by the controller starts in the non-volatile memory or in the ROM memory, wherein
   where the program execution starts is selectively set in accordance with the setting of the external input terminal when the information processing apparatus is activated.

36. The information processing apparatus as claimed in claim 35, wherein a rewriting program for the whole program of the non-volatile memory is stored in the ROM memory.

37. An information processing apparatus for communicating with a host computer comprising:
   a controller (CPU) for controlling the apparatus;
   a non-volatile memory provided for storing a whole program in which the controller controls the apparatus therein; and
   a rewriting device for the whole program stored in the non-volatile memory, wherein
   the rewriting device for the whole program stored in the non-volatile memory comprises a storage state judging unit for judging a storage state of the whole program of the non-volatile memory, and
   the storage state judging unit makes a judgment by comparing a fixed code (or fixed value) previously memorized as ROM in the storage state judging unit to a code generated by means of a calculating formula preset with respect to the whole program stored in the non-volatile memory.

38. The information processing apparatus as claimed in claim 37, wherein the storage state judging unit judges only a partial region of the non-volatile memory previously specified.

39. An information processing apparatus for processing communication data obtained through data communication between the information processing apparatus and a host computer comprising:
   a communication device for executing the data communication between the information processing apparatus and the host computer;
   a volatile memory provided for storing the communication data therein; and
   a controller for controlling communication processings of the communication device and information processings to be executed to the communication data stored in the volatile memory, wherein
   the controller comprises:
   a data storing unit in which a communication program of the communication device is previously stored in a non-volatile state; and
   a data movement controller for moving the communication program from the data storing unit to the volatile memory and executing the communication program on the volatile memory.

40. The information processing apparatus as claimed in claim 39, further comprising:
   a non-volatile memory provided for storing therein a whole program of the information processing apparatus including a program equal to the communication program, wherein the communication program provided separately from the whole program is previously stored in the data storing unit.

41. The information processing apparatus as claimed in claim 40, wherein the processing of the data movement controller is executed when the information processing apparatus is activated.

42. The information processing apparatus as claimed in claim 40, wherein
the controller further comprises a storage judging unit for judging whether or not the whole program is stored in the non-volatile memory when the information processing apparatus is activated, and
the data movement controller executes the whole program on the non-volatile memory in the case where the storage judging unit judges that the whole program is stored in the non-volatile memory, and executes the processing of the data movement controller in the case where the storage judging unit judges that the whole program is not stored in the non-volatile memory.

43. The information processing apparatus as claimed in claim 42, further comprising an external input terminal adapted in such a manner that an operational personnel can set whether or not the judgment processing by the storage judging unit is executed, wherein
the data movement controller reads the setting of the external input terminal to thereby change a control state thereof when the information processing apparatus is activated.

44. The information processing apparatus as claimed in claim 43, wherein
the data movement controller reads the setting of the external input terminal to thereby set the control state thereof and rewritably records the setting of the external input terminal in the volatile memory when a power supply of the information processing apparatus is turned off and the apparatus is reactivated, and
the data movement controller does not read the setting of the external input terminal but reads the setting of the external input terminal from the volatile memory to thereby set the control state thereof when the information processing apparatus with the power supply remaining ON is reactivated on software.

45. The information processing apparatus as claimed in claim 40, wherein
the controller further comprises a state judging unit for judging a recoding state of the non-volatile memory when the information processing apparatus is activated, and
the data movement controller judges that the whole program is stored in the non-volatile memory in a normal recording state when the state judging unit judges that the recording state is normal and accordingly executes the whole program on the non-volatile memory, and executes the processing of the data movement controller when the state judging unit judges that the recording state is abnormal.

46. The information processing apparatus as claimed in claim 45, wherein the state judging unit judges only a partial region of the non-volatile memory previously specified.

47. The information processing apparatus as claimed in claim 45, wherein the state judging unit judges only a state of the whole program stored in the non-volatile memory.

48. The information processing apparatus as claimed in claim 45, further comprising an external input terminal adapted in such a manner that an operational personnel can set whether or not the judgment processing by the state judging unit is executed, wherein
the data movement controller reads the setting of the external input terminal to thereby change a control state thereof when the information processing apparatus is activated.

49. The information processing apparatus as claimed in claim 48, wherein
the data movement controller reads the setting of the external input terminal to thereby set the control state thereof and rewritably records the setting of the external input terminal in the volatile memory when a power supply of the information processing apparatus is turned off and the apparatus is reactivated, and
the data movement controller does not read the setting of the external input terminal but reads the setting of the external input terminal from the volatile memory to thereby set the control state thereof when the information processing apparatus with the power supply remaining ON is reactivated on software.

50. The information processing apparatus as claimed in claim 41, wherein
the controller comprises an authenticating unit for inspecting whether or not a preset authentication data is attached to the data transmitted from the host computer, and
the data movement controller executes the processing of the data movement controller when the authenticating unit judges that the authentication data is attached.

51. The information processing apparatus as claimed in claim 40, wherein
the data movement controller executes the communication program on the volatile memory to thereby transmit the whole program and a writing program for writing the whole program from the volatile memory into the non-volatile memory from the host computer to the volatile memory, and
the data movement controller further operates the transmitted writing program on the volatile memory to thereby write the whole program in the non-volatile memory.

52. The information processing apparatus as claimed in claim 39, wherein
the communication program inspects a communication result per a certain volume of data, and continues the communication only when a result of the inspection shows normality.

53. A method for temporarily recording a communication data obtained through data communication between an information processing apparatus and a host computer in a volatile memory and writing the obtained communication data in a non-volatile memory, comprising:
a first step for retaining a communication program for the data communication between the information processing apparatus and the host computer in a non-volatile state apart from the storage in non-volatile memory, writing the retained communication program in the volatile memory, and executing the written communication program on the volatile memory;
a second step for receiving a writing program for writing the communication data from the volatile memory into the non-volatile memory and the communication data from the host computer by executing the communication program on the volatile memory; and
a third step for writing the communication data from the volatile memory into the non-volatile memory by executing the writing program on the volatile memory.

54. The data writing method as claimed in claim 53, further comprising a storage judging step for judging whether or not data is stored in the non-volatile memory prior to the first step, wherein the first through third steps are executed when it is judged in the storage judging step that the data is not stored.

55. The data writing method as claimed in claim 53, further comprising a state judging step for judging a state of data stored in the non-volatile memory prior to the first step, wherein the first through third steps are executed when it is judged in the state judging step that the state of the data is abnormal.

56. The data writing method as claimed in claim 55, wherein only a partial region of the non-volatile memory previously specified is judged in the state judging step.

57. The data writing method as claimed in claim 55, wherein only a region of the non-volatile memory currently used is judged in the state judging step.

58. The data writing method as claimed in claim 53, further comprising an authenticating step for inspecting whether or not a preset authentication data is attached to the data transmitted from the host computer prior to the second step, wherein the second step and the third step are executed when the authenticating step judges that the authentication data is attached.

59. The data writing method as claimed in claim 53, wherein a communication result is inspected per a certain volume of data so that the communication is continued only when a result of the inspection shows normality in the second step.

* * * * *